United States Patent
Kojima et al.

(10) Patent No.: US 7,569,635 B2
(45) Date of Patent: Aug. 4, 2009

(54) POLYPHENYLENE SULFIDE RESIN COMPOSITIONS

(75) Inventors: Akira Kojima, Nagoya (JP); Takeshi Nishi, Nagoya (JP); Hisaya Iwamura, Nagoya (JP)

(73) Assignee: Toray Industries, Inc. (JP)

(*) Notice: Subject to any disclaimer, the term of this patent is extended or adjusted under 35 U.S.C. 154(b) by 512 days.

(21) Appl. No.: 10/558,548

(22) PCT Filed: May 25, 2004

(86) PCT No.: PCT/JP2004/007087
§ 371 (c)(1), (2), (4) Date: Nov. 29, 2005

(87) PCT Pub. No.: WO2004/108827
PCT Pub. Date: Dec. 16, 2004

(65) Prior Publication Data
US 2007/0021549 A1    Jan. 25, 2007

(30) Foreign Application Priority Data
Jun. 5, 2003  (JP) .................... 2003-161349

(51) Int. Cl.
*C08K 3/40* (2006.01)
(52) U.S. Cl. .............. 524/494; 524/492; 524/493
(58) Field of Classification Search ............ None
See application file for complete search history.

(56) References Cited

U.S. PATENT DOCUMENTS

| | | | | |
|---|---|---|---|---|
| 4,645,825 A * | 2/1987 | Idel et al. | ............... | 528/388 |
| 4,898,904 A * | 2/1990 | Yu et al. | ............... | 524/399 |
| 5,026,764 A * | 6/1991 | Okabe et al. | ............... | 524/540 |
| 5,028,656 A * | 7/1991 | Okabe et al. | ............... | 524/510 |
| 5,173,524 A * | 12/1992 | Satoh | ............... | 524/496 |
| 5,336,713 A * | 8/1994 | Nagaoka et al. | ............... | 524/540 |
| 5,340,861 A * | 8/1994 | Chen et al. | ............... | 524/166 |
| 5,349,027 A * | 9/1994 | Ueki et al. | ............... | 525/331.7 |
| 5,457,152 A * | 10/1995 | Gaa et al. | ............... | 524/449 |
| 5,470,901 A * | 11/1995 | Ishiwari et al. | ............... | 524/345 |
| 5,504,128 A * | 4/1996 | Mizutani et al. | ............... | 524/104 |
| 5,654,358 A * | 8/1997 | Kadoi et al. | ............... | 524/505 |
| 6,395,818 B1 * | 5/2002 | Murakami et al. | ............... | 524/492 |
| 7,282,170 B2 * | 10/2007 | Dutmer et al. | ............... | 264/328.18 |
| 2002/0169237 A1 * | 11/2002 | Ono et al. | ............... | 523/400 |
| 2003/0153449 A1 * | 8/2003 | Nakagawa et al. | ............... | 501/35 |
| 2003/0153660 A1 * | 8/2003 | Nishihata et al. | ............... | 524/210 |
| 2003/0235688 A1 * | 12/2003 | Mizukami et al. | ............... | 428/402 |
| 2004/0110880 A1 * | 6/2004 | Sugawara et al. | ............... | 524/155 |

FOREIGN PATENT DOCUMENTS

EP    0 330 488 A    8/1989

OTHER PUBLICATIONS http://www.owenscorningchina.com/upload/File/ 973522365.pdf.*
http://techcenter.lanxess.com/scp/emea/en/products/ gf/article.jsp?docId=61968.*
http://www.ptonline.com/articles/200202fa2.html (Published online 2002).*

* cited by examiner

*Primary Examiner*—David Wu
*Assistant Examiner*—Vu Nguyen
(74) *Attorney, Agent, or Firm*—DLA Piper LLP (US)

(57) ABSTRACT

A polyphenylene sulfide resin composition which comprises 100 parts by weight of a polyphenylene sulfide resin (A) and, compounded therewith, 1 to 100 parts by weight of glass fibers (B) having a single-fiber diameter of 12 μm or lager and has a crystallization temperature during cooling of 205° C. or lower. Also provided is a polyphenylene sulfide resin composition which comprises 100 parts by weight of a polyphenylene sulfide resin (A) and, compounded therewith, 1 to 100 parts by weight of glass fibers (B) having a single-fiber diameter of 10 to 12 μm, excluding 12 μm, has a crystallization temperature during cooling of 205° C. or lower and a chloroform-extractable content of 0.5 wt. % or lower, and gives a 2 mm-thick molded product which has a transmittance of 15% or higher for laser beam having a wavelength of 940 nm and a heat distortion temperature of 230° C. or higher under a load of 1.82 MPa.

29 Claims, No Drawings

POLYPHENYLENE SULFIDE RESIN COMPOSITIONS

TECHNICAL FIELD

This disclosure relates to a polyphenylene sulfide resin composition, and more particularly, a polyphenylene sulfide resin composition capable of obtaining an excellent laser weldability and heat resistance without lowering the degree of freedom for design of a molded product, even when used for the molded product of the laser beam transmitting side in a laser welding method.

DESCRIPTION OF BACKGROUND ART

Polyphenylene sulfide resin composition is widely used for electrical and electronic components and automobile parts because it is provided with well-balanced properties such as excellent mechanical properties, heat resistance, chemical resistance and thin fluidity.

Conventionally, in case of resin molded product of complicated shape, a plurality of separated parts are molded beforehand, then these parts are integrally bonded to obtain a product of complicated shape. As means for integrally bonding a plurality of parts in such a manner, bonding by adhesive agent, mechanical bonding with bolt or the like, bonding by external heat welding such as laser welding, hot plate welding, and bonding by friction heat welding such as vibration welding, ultrasonic welding have been used. Among these means, it is difficult to obtain high bonding strength by the bonding with bonding agent, and the mechanical bonding requires more cost and labor and, moreover, causes weight increase. However, bonding by external heat welding or friction heat welding has been increasingly used in recent years, because it doesn't use extra material such as adhesive agents or bolts and, moreover, it doesn't causes problems such as an environmental pollution, weight increase.

Among the aforementioned external heat welding, the laser welding method, in particular, has an advantage of being performed easily. The laser welding method for two resin molded products, as disclosed for instance in JP S60-214931 A1, is executed by irradiating laser beam from one of superposed two molded products to the other. The laser beam transmits through the molded product of irradiating side to be absorbed into the molded product of the other side and melts the resin to fuse and bond both molded products therebetween. Therefore, it is essential for laser welding method that the laser beam transmits through the molded product of irradiation side into the other molded product. Consequently, two molded products can not be bonded, or a sufficient bonding strength can not be obtained, if a resin material with low laser beam transmittance is used for the molded product into which the laser beam transmits.

Whereas, the aforementioned polyphenylene sulfide resin of high crystallinity is characterized by significantly low laser beam transmittance. Therefore, in case of using polyphenylene sulfide resin composition for a molded product of laser beam transmitting side in the laser welding method, it has been necessary to thin the molded product so as to transmit the laser beam. Consequently, in case of bonding polyphenylene sulfide resin composition by the laser welding method, there has been a problem that degree of freedom for design of the molded product becomes inevitably low.

It could therefore be helpful to provide a polyphenylene sulfide resin composition capable of obtaining excellent laser weldability and heat resistance without lowering the degree of freedom for design of the molded product, even when used for the molded product of laser beam transmitting side in the laser welding method.

It could also be helpful to provide a polyphenylene sulfide resin composition with excellent low warpage properties that reduces the generation of warpage when it is molded.

SUMMARY

Our polyphenylene sulfide resin compositions are characterized in that 100 parts by weight of a polyphenylene sulfide resin (A) is compounded with 1 to 100 parts by weight of glass fiber (B) having a monofilament diameter of 12 μm or larger and crystallization temperature on cooling is 205° C. or lower. It should be noted that "weight" means "mass" herein.

Laser transmittance of a polyphenylene sulfide resin composition and heat resistance can be improved, by compounding 1 to 100 parts by weight of glass fiber (B) having a monofilament diameter of 12 μm or larger with respect to 100 parts by weight of polyphenylene sulfide resin (A) and keeping the crystallization temperature on cooling is 205° C. or lower. Therefore, an excellent laser weldability can be exhibited, if this polyphenylene sulfide resin composition is used for the molded product of laser beam transmitting side in the laser welding method. In addition, as the laser weldability is excellent, the degree of freedom for design can be improved when polyphenylene sulfide resin composition is injection molded.

Moreover, it is preferable to make chloroform-extractable content to be 0.5 weight % or lower for the polyphenylene sulfide resin composition. The laser weldability can be further improved by reducing this chloroform-extractable content. Besides, it is possible to make a 2 mm-thick molded product with a laser beam transmittance of 15% or higher at a wavelength of 940 nm and to provide a heat resistance with a heat distortion temperature of 230° C. or higher under a load of 1.82 MPa.

Glass fiber (B) to be compounded with polyphenylene sulfide resin composition has a monofilament diameter of 12 μm or larger and preferably a thick monofilament diameter of 15 μm or larger, however, even the monofilament diameter of the glass fiber is less than 12 μm, laser welding and heat resistance as excellent as mentioned above can be obtained by adopting the following composition, if the monofilament diameter is 10 μm or larger.

In short, another polyphenylene sulfide resin composition compounded with the aforementioned glass fiber is characterized in that 100 parts by weight of polyphenylene sulfide resin (A) is compounded with 1 to 100 parts by weight of glass fiber (B) having a monofilament diameter of 10 μm or higher but less than 12 μm and the crystallization temperature on cooling is 205° C. or lower and a chloroform-extractable content is 0.5 weight % or lower, and further more, the laser beam transmittance is 15% or higher at a wavelength of 940 nm when the molded product is 2 mm-thick and the heat distortion temperature is 230° C. or higher under a load of 1.82 MPa.

For the polyphenylene sulfide resin composition, in addition to the aforementioned component (A) and (B), it is advantageous to be compounded furthermore with 1 to 200 parts by weight of filler (C) having a refractive index of 1.6 to 1.8 and/or filler (D) having a refractive index of less than 1.6 or more than 1.8 and an average particle diameter of 30 μm or larger. By compounding such fillers, it is possible to inhibit the warpage of the injection molded product and moreover to improve the heat resistance and mechanical strength.

As for the aforementioned filler (C), fibrous or plate alumina hydrate (C1), and/or fiber or granular H glass (C2) are preferable. Besides, for the aforementioned filler (D), glass flake (D1) and/or glass bead (D2) are preferable.

In addition to the aforementioned component (A) and (B), the polyphenylene sulfide resin composition may be compounded with 0.1 to 200 parts by weight of one or plural kinds of amorphous resin selected from polyamide-imide resin (E1), polyetherimide resin (E2), polyethersulfone resin (E3) and polysulfone resin (E4). By compounding this amorphous, laser weldability and warpage properties can further be improved.

Also, in addition to the aforementioned component (A) and (B), the polyphenylene sulfide resin composition may further be compounded with 0.01 to 3 parts by weight of silane compound (F) and/or 0.01 to 3 parts by weight of anti-oxidant (G). By compounding them, not only the laser weldability and warpage properties but also the mechanical strength can further be improved.

Moreover, in addition to the aforementioned component (A) and (B), the polyphenylene sulfide resin composition may further be compounded with 0.5 to 20 parts by weight of elastomer (H). By compounding this elastomer (H), cold and heat resistance or impact resistance of the polyphenylene sulfide resin composition can be improved.

The polyphenylene sulfide resin composition can exhibit an excellent weldability as a molded product of laser beam transmitting side, when it is made into a composite molded product by bonding with other resin molded product by the laser welding method, in particular, it shows a remarkable effect in case where the transmitting section thickness of welding site is 5 mm or lower. The other resin for the composite molded product may be polyphenylene sulfide resin, or other than polyphenylene sulfide resin composition.

DETAILED DESCRIPTION

The polyphenylene sulfide (hereinafter referred to as PPS) resin composition is characterized in that 100 parts by weight of PPS resin (A) is compounded with 1 to 100 parts by weight of glass fiber (B) having a monofilament diameter of 12 µm or larger and, moreover, the crystallization temperature on cooling as PPS resin composition is 205° C. or lower. Preferably, this PPS resin composition has a chloroform-extractable content of 0.5 weight % and, laser beam transmittance is 15% or higher at a wavelength of 940 nm when it is made into a 2 mm-thick molded product, and a heat distortion temperature is 230° C. or higher under a load of 1.82 MPa. Besides, in case where PPS resin composition is compounded with glass fiber (B) having a monofilament diameter of 10 µm or larger but less than 12 µm, it may be made so that the crystallization temperature on cooling is 205° C. or lower and the chloroform-extractable content is 0.5 weight % or lower, and the laser beam transmittance is 15% or higher at a wavelength of 940 nm when it is made into a 2 mm-thick molded product, and the heat distortion temperature is 230° C. or higher under a load of 1.82 MPa.

The PPS resin composition can be made to exhibit extremely excellent laser weldability, by adopting the aforementioned composition. In order to keep the crystallization temperature of a PPS resin on cooling at 205° C. or lower as mentioned above, PPS resin composition of low crystallization temperature on cooling may be used. Also, a PPS resin of low chloroform-extractable content may be used for making the chloroform-extractable content of the PPS resin composition 0.5 weight % or lower. Now, PPS resins to be used for the present invention and components to be compounded with this PPS resin shall be described hereinafter.

(1) PPS Resin

The PPS resin (A) is a polymer having a repeating unit shown by the following structural formula, and preferably the polymer has 70 mol % or more, in particular, 90 mol % or more of repeating unit shown by the structural formula, to obtain a favorable heat resistance.

[Formula 1]

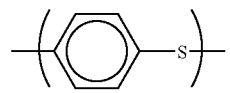

Besides, the parts less than 30 mol % of a repeating unit of the PPS resin can be composed of a repeating unit and the like having the following structure.

[Formula 2]

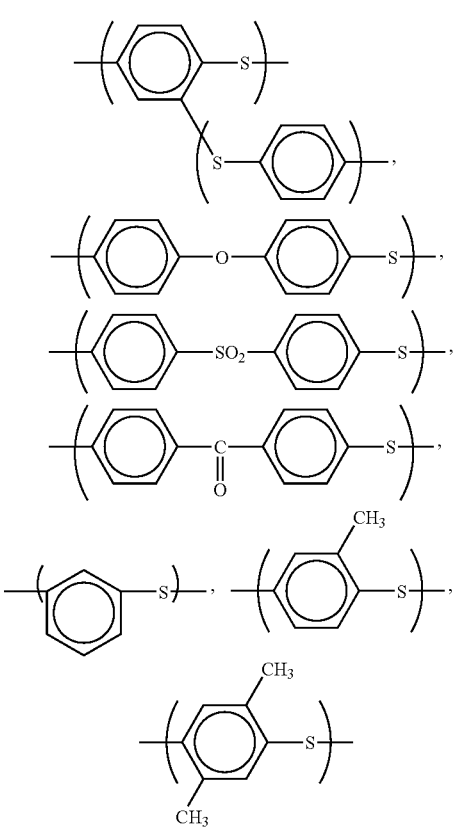

A PPS resin composition of low crystallization temperature on cooling may be used for keeping the crystallization temperature of the PPS resin composition on cooling within a prescribed range. Preferably, PPS resins having a crystallization temperature on cooling of 200° C. or lower, more preferably, 195° C. or lower are used. The lower limit of the crystallization temperature on cooling is preferably 170° C. or higher from a perspective of heat resistance. The crystallization temperature on cooling of PPS resin tends to decrease as the molecular weight increases, namely as the melt flow rate (hereinafter referred to as MFR) decreases. Consequently, MFR of the PPS resins to be used is 500 g/10 min or lower, preferably 350 g/10 min or lower and, especially preferably 200 g/10 min or lower. The lower limit of MFR is preferably 30 g/10 min or higher from a perspective of fluidity loss. It should be noted that MFR is a value measured under a load of 5 kg after having dried 5 g of PPS resin powder at 130° C. for 3 hours and melted at 315.5° C. to stay for 5 mm, conforming to JIS-K7210.

If a co-polymer of meta-phenylene sulfide unit and para-phenylene sulfide unit are used as PPS resin, the melting point lowers according to the copolymerized amount of the meta-phenylene sulfide unit, permitting the crystallization temperature on cooling to lower. Furthermore, as another method for lowering the crystallization temperature on cooling of PPS resin, a method can be cited that uses a polyhaloaromatic compound of trihalo or more in combination with a dihaloaromatic compound when the polymerization starts. A branched polymer or a crosslinked polymer is formed by this method to lower the crystallization temperature on cooling.

A PPS resin having sufficiently low chloroform-extractable content may be used for keeping the chloroform-extractable content of the PPS resin composition within the prescribed range. More specifically, the chloroform-extractable content of PPS resins is preferably 0.6 weight % or lower, and more preferably 0.4 weight % or lower. The MFR of PPS resin is preferably 500 g/10 min or lower, and especially preferably 300 g/10 min or lower, because generally the chloroform-extractable content tends to decrease as the molecular weight increases, namely as the MFR lowers.

Besides, as for a method for reducing the chloroform-extractable content of PPS resin, a post treatment such as an organic solvent treatment, acid treatment or heat treatment of PPS resin after polymerization may be executed. The organic solvent treatment, in particular, is preferable, because it has a significant effect for lowering the chloroform-extractable content. The heat treatment is executed preferably under inactive atmosphere, in order to avoid the decrease of laser weldability by the discoloration PPS resin. However, even if the heat treatment is executed under inactive atmosphere, a heat treatment at high temperature for a long period of time should be avoided, because it will color the PPS resin to cause deterioration of the laser weldability. The heating temperature is 120 to 220° C., and preferably 150 to 200° C. Besides, the heating time is 5 to 20 hours, and preferably 10 to 15 hours:

(Polymerization of PPS Resin)

In general, PPS resin can be produced by using the method for obtaining polymers of relatively low molecular weight as described in the JP S45-3368 B1, or of relatively heavy molecular weight as described in the JP S52-12240 B1 and the like. The difference between the former and the latter is the presence/absence of alkali metal carboxylate as a polymerization auxiliary in the polymerization system.

In the former, since alkali metal carboxylate is not added into the polymerization system and the degree of polymerization does not increase, the molecular weight is relatively low and the crystallization temperature on cooling increases. Moreover, since the polymer contains a lot of impurities and the chloroform-extractable content increases, discoloration by heat of the compositions or the molded products during the manufacturing results in the reduction of the laser weldability. In case of the latter, since alkali metal carboxylate is added into the polymerization system and the degree of polymerization increases, the molecular weight is relatively large and the crystallization temperature on cooling decreases, making it relatively easy to keep the crystallization temperature on cooling within our range. Also, since it contains less impurities, the chloroform-extractable content decreases, permitting to inhibit the discoloration by heat and present an excellent laser weldability.

The latter method can relatively easily satisfy selected conditions; however, it is necessary to adjust reaction conditions so that the PPS resin satisfies our range. Nevertheless, it is possible to adjust the PPS resin fluidity and others by using in combination with the PPS resin according to the former method.

Besides, in polyphenylene sulfide copolymer where methaphenylene-sulfide unit is introduced into a PPS resin having para polyphenylene sulfide unit, the crystallization temperature on cooling is low compared with a polymer having paraphenylene-sulfide unit alone, as mentioned above. As for the copolymerization ratio (molar fraction) of these units, the methaphenylene-sulfide unit is preferably 1 mol % or higher to the total of methaphenylene-sulfide units and paraphenylene-sulfide units, and more preferably, 3 mol % or higher. The upper limit is preferably less than 15 mol % from the perspective of heat resistance. As for copolymerization mode, any of random copolymerization and block copolymerization is acceptable; however, random copolymerization is preferable from a perspective of balance of laser weldability and heat resistance.

Moreover, also the method for using in combination with polyhaloaromatic compound of trihalo or more when the polymerization starts can lower the crystallization temperature on cooling as mentioned above. In this case, as for the copolymerization amount of polyhaloaromatic compound, the polyhaloaromatic compound is preferably 0.01 mol % or higher to the total of polyhaloaromatic compound and dihaloaromatic compound, more preferably 0.04% or higher and still more preferably 0.06% or higher. The upper limit is preferably 0.1 mol % or lower from a perspective of fluidity loss. Concrete examples of polyhaloaromatic compound includes 1,3,5-trichlorobenzene, 1,2,4-trichlorobenzene, 1,3,5-tribromobenzene, 1,2,4-tribromobenzene, and the like. Besides, it is also possible to use activated hydrogen-containing halogen aromatic compounds and halogen aromatic nitro compounds in combination with dihaloaromatic compounds.

(Post Treatment)

Post treatments of PPS resin such as heating treatment, washing with an organic solvent, acid treatment or carboxilic metal salt aqueous solution treatment are effective as means for improving the laser weldability by lowering PPS resin crystallization temperature on cooling and the chloroform-extractable content, or for improving mechanical properties.

Among the aforementioned PPS resin post treatment methods, heating treatment can be executed for the purpose of removing impurities, namely chloroform extracts, which cause discoloration. However, an excessive heating treatment is not preferable, because it provokes oxidation coloring that deteriorates the laser weldability. Concrete heating treatment conditions are as mentioned below.

In short, usually, the heating treatment of PPS resin is executed in a range of 200 to 260° C., however, heating at such a high temperature causes oxidation coloring. Therefore, the heating treatment is preferably executed in a temperature range of 120 to 220° C., more preferably in a temperature range of 150 to 200° C. Also, the heating time is preferably 5 to 20 hours, more preferably 10 to 15 hours. As for the heating treatment atmosphere, it is preferable to heat under an inactive atmosphere such as nitrogen atmosphere, because the laser weldability is significantly deteriorated due to oxidation coloring under an oxygen atmosphere.

Organic solvent washing of PPS resin is preferable because it permits to remove impurities causing the discoloration, namely chloroform extracts. Organic solvents to be used for washing PPS resin are not specifically limited, provided that they do not have any function of decomposing PPS resin, and the like.

Examples of such organic solvent include, for instance, nitrogen-containing polar solvents such as N-methyl-2-pyrrolidon (abbreviated as NMP, hereinafter), dimethylformamide dimethylacetamide, 1,3-dimethylimidazolyzinon, hexamethyl phosphorasamide and piperazions, sulfoxidesulfone based sovents such as dimethylsulfoxide, dimethylsulfone and sulfolane, ketone based solvents such as acetone, methylethylketone, diethylketone and acetophenone, ether based solvents such as dimethylether, dipropylether, dioxane and tetrahydrofuran, halogen based solvent such as chloroform, methylenechloride, trichloroethylene, dichlorothylene, perchloroethane and chlorobenzen, alcohol-phenol based solvents such as methanol, ethanol, propanol, butanol, pentanol, ethylene glycol, propylene glycol, phenol, cresol, polyethylene glycol and polypropylene glycol, and aromatic hydrocarbon-based solvents such as benzene, toluene and xylene can be cited. Among these organic solvents, especially, NMP, acetone, dimethylformamide and chloroform is preferably used. Besides, of these organic solvents, either one kind or two or more kinds of mixed solvents are used.

As a method for washing PPS resin with organic solvent, there is a method of immersing PPS resin in an organic solvent and the like, and it is preferable to be executed while stirring or heating, in order to make the effect more remarkable. The amount of organic solvent to be used for the PPS resin is not specifically limited, however the amount is preferably 1 to 100 kg with respect to 1 kg of dry PPS resin, more preferably 2 to 50 kg, and still more preferably 3 to 15 kg.

The washing temperature for washing PPS resin with organic solvent is not specifically limited and can be optionally selected within a range from normal temperature to around 300° C. Nevertheless, it is preferable to wash at a high temperature of 100 to 300° C., because the washing effect tends to increase as the washing temperature increases. It is also possible to wash in a pressure vessel under pressure at a temperature of boiling point of the organic solvent or higher, preferably 250 to 300° C. Besides, the washing time also is not specifically limited, however, it is preferable to wash for 30 to 60 min or longer, in case of batch type washing. The washing may also be continuous.

Washing the PPS resin with the organic solvent may be executed in combination with water washing, in order to make the aforementioned effect further remarkable. Besides, in case of using a high boiling point water-soluble organic solvent such as N-methyl pyrrolidone for organic solvent washing, residual organic solvent can be removed relatively easily by washing with water after the organic solvent washing. Water used for water washing is preferably distilled water and deionized water. The water washing temperature is preferably 50 to 90° C., and more preferably, 60 to 80° C.

Besides, among the aforementioned post-treatments of PPS resin, the acid treatment is effective for removing impurities that cause oxidation coloring, namely chloroform extracts, or improving mechanical characteristics. However, an excessive acid treatment develops a terminal substituents reaction of PPS resin, increases the crystallization temperature on cooling, resulting in a deterioration of laser weldability.

Acids used for acid treatment of PPS resin are not specifically limited, provided that they don't have any function to decompose the PPS resin, preferably pH of those acids are 3.5 to 5.5. For instance, acetic acid, silicate, carbonic acid, propyl acid are preferable, and acetic acid is especially preferable among others. For instance, when the PPS resin is acid treated with a strong acid of pH 2 or lower such as hydrochloric acid, sulfuric acid or phosphoric acid, an excessive acid treatment is provoked to increase the crystallization temperature on cooling and the laser weldability could deteriorate. Also, those that decompose and deteriorate PPS resin, such as sulfuric acid are not preferable.

As for methods of PPS resin acid treatment, there is a method of immersing PPS resin in an acid or in an aqueous solution of acid, and it is preferable to stir or heat, in order to make the effect more remarkable. The treatment time may be 30 to 60 mm or longer. Further, the amount of acid to be used is preferably 2 to 100 kg to 1 kg of dry PPS resin, more preferably 4 to 50 kg, and still more preferably 5 to 15 kg. The treatment temperature is not specifically limited, it can be treated at a room temperature. In case of heating, it can be executed at 50 to 90° C. For instance, in case of using acetic acid, it is preferable to immerse PPS resin powder in an aqueous solution of PH 4 kept at the room temperature, and to stir for 30 to 60 min.

The PPS resin treated by an acid may be washed several times with water to physically remove residual acid or salts. The water washing temperature is preferably 50 to 90° C., and more preferably 60 to 80° C. Water used for washing may preferably be distilled water and deionized water, in order not to deteriorate the effect of chemical modification of PPS resin by acid treatment.

The acid treatment of PPS resin may be repeated several times and may also be executed in combination with the aforementioned other treatments.

Besides, among post-treatment of PPS resin, carboxilic metal salt aqueous solution treatment is effective for balancing the laser welding effect and mechanical properties improvement.

Concrete examples of metal carboxylate used for the carboxilic metal salt aqueous solution treatment include, for instance, lithium acetate, sodium acetate, potassium acetate, calcium acetate, magnesium acetate, lithium propinate, sodium propinate, potassium propinate, calcium propinate, magnesium propinate, lithium 2-methylpropinate, rubidium butyrate, lithium valerate, sodium valerate, potassium valerate, calcium valerate, magnesium valerate, cesium hexanoate, lithium heptanoate, lithium 2-methyloctanate, potassium dodecanoate, rubidium 4-ethyltetradecanoate, sodium octadecanoate, sodium heneicosanoate, lithium cyclohexane carboxylate, calcium cyclohexane carboxylate, magnesium cyclohexane carboxylate, cesium cyclohexane carboxylate, cesium 3-methylcyclopentane carboxylate, potassium cyclohexylacetate, calcium cyclohexylacetate, magnesium cyclohexylacetate, potassium benzoate, calcium benzoate, magnesium benzoate, potassium m-toluate, lithium phenylacetate, calcium phenylacetate, magnesium phenylacetate, sodium 4-phenylcyclohexane carboxylate, calcium 4-phenylcyclohexane carboxylate, magnesium 4-phenylcyclohexane carboxylate, potassium p-tolylacetate, calcium p-tolylacetate, magnesium p-tolylacetate, lithium 4-ethylcyclohexyl-acetate, calcium 4-ethylcyclohexylacetate, magnesium 4-ethylcyclohexylacetate, other similar salts, and mixtures thereof may be cited. Among others, sodium acetate, calcium acetate and magnesium acetate are preferable.

It is advantageous to stir or heat during the treatment, in order to obtain a more remarkable effect of carboxilic metal salt aqueous solution treatment of PPS resin. The treatment time is preferably 30 to 60 min or longer. As for the concentration of carboxilic metal salt aqueous solution, it is advantageous to adjust the concentration or quantity of the aqueous solution so that metal carboxylate is 0.1 to 100 g to 1 kg of PPS resin. Normally, the treatment temperature is preferably in the range from a room temperature to 300° C. The PPS resin treated by the carboxilic metal aqueous solution is preferably washed several times with water, in order to physically remove salts or the like. The temperature of water washing is preferably 50 to 95° C.

Distilled water or deionized water is preferably used for washing in order not to deteriorate the effect of chemical modification of PPS resin by the carboxilic metal aqueous solution. Besides, the treatment with the carboxilic metal aqueous solution may be repeated several times and may also be executed in combination with the aforementioned other post-treatments.

(2) Glass Fiber

As for glass fiber (B) to be compounded with PPS resin, those of monofilament diameter of 12 μm or higher are used. By compounding this glass fiber (B), the laser transmittance can be enhanced and the laser weldability can be improved. However, even if the monofilament diameter is less than 12 μm, good results can be achieved by using glass fibers of 10 μm or larger but less than 12 μm as the glass fiber (B), in case where a PPS resin composition has a laser transmittance of 15% or higher at a wavelength of 940 nm and, at further more, has a heat distortion temperature of 230° C. or higher under a load of 1.82 MPa, when the PPS resin composition is molded to be 2 mm-thick.

The monofilament diameter of the glass fiber (B) is preferably thick, in order to enhance the laser transmittance of the PPS resin composition. To be more specific, except for the case using a glass fiber having a monofilament diameter of less than 12 μm as mentioned above, the monofilament diameter of the glass fiber to be used is 12 μm or larger, preferably 15 μm or larger, and especially preferably 17 μm or higher. The upper limit of the monofilament diameter of glass fiber is preferably 35 μm or less from a perspective of lowering of properties such as heat distortion temperature and mechanical strength.

As for the material of the glass fiber (B), E glass, H glass, A glass, C glass, natural quartz glass, synthetic quartz glass or the like can be cited, and in particular E glass and H glass are preferable. The kind of glass fiber is not specifically limited, provided that they are usually used for reinforcing resins, and for instance, chopped strand and milled fiber of long fiber type or short fiber type and the like can be used. It should be noted that the monofilament diameter is the value measured by the test method based on JIS-R3420 5,6. The average particle diameter is the average value obtained by the microtrack method where 0.70 g of sample is irradiated with laser beam after ethanol is added and ultrasonically dispersed for 3 min.

The compounding ratio of glass fiber (B) to PPS resin may be 1 to 100 parts by weight with respect to 100 parts by weight of PPS resin, preferably 5 to 100 parts by weight, and more preferably 10 to 70 parts by weight. In case of a glass fiber having a monofilament diameter of 10 μm or larger but less than 12 μm also, it can be added by the same compounding ratio as in the case of the aforementioned glass fiber of 12 μm or larger. The compounding amount of glass fiber to obtain a PPS resin composition having specific laser beam transmittance may be properly adjusted according to the monofilament diameter and other condition.

(3) Fillers Except for Aforementioned (B) Component

Fillers except for the aforementioned (B) component may be added to the PPS resin composition to improve the heat resistance, warpage properties of the molded product, mechanical strength and the like, on the condition that the effect of laser weldability is not deteriorated.

As concrete examples of fillers except for the aforementioned (B) component may include fibrous fillers, and non-fibrous fillers such as plate, scaly, granular, irregular-shape or crashed fillers. For example, metal fibers such as stainless fiber, aluminum fiber, brass fiber, organic fibers such as aromatic polyamide fiber, gypsum fiber, ceramic fiber, asbestos fiber, zirconia fiber, alumina fiber, silica fiber, titanium oxide fiber, silicon carbide fiber, rock wool, alumina hydrate (whisker, plate shape), potassium titanate whisker, barium titanate whisker, aluminum borate whisker, silicon nitride whisker, talc, kaolin, silica (crushed, spherical), quartz, calcium carbonate, glass bead, glass flake, crushed/irregular-shape glass, glass microballoon, clay, molybdenum disulfide, wollastonite, metal oxides such as aluminum oxide(crushed), translucent alumina (fibrous, plate, scaly, granular, irregular-shape, crushed product), titan oxide(crushed), zinc oxide (fibrous, plate, scaly, granular, irregular-shape, crushed product), metal hydrates such as aluminum hydroxide (fibrous, plate, scaly, granular, irregular-shape, crushed product), aluminum nitride, translucent aluminum nitride(fibrous, plate, scaly, granular, irregular-shape, crushed product), calcium polyphosphate, graphite, metal powder, metal flake, metallic ribbon, and other metal oxides.

Concrete examples of metal elements for metal powder, metal flake and metallic ribbon are silver, nickel, copper, zinc, aluminum, stainless, iron, brass, chromium, tin and the like. Moreover, though fillers such as carbon powder, graphite, carbon flake, scaly carbon, carbon nanotube, PAN-based or pitch-based carbon fiber and mica lower the laser weldability, they may be added by such a small amount that does not deteriorate the practical laser weldability performance, for the purpose of coloring the PPS resin composition.

As for fillers except for aforementioned (B) component, E glass, H glass, A glass, C glass, natural quartz glass, synthetic quartz glass or the like of plate, scaly, granular, irregular-shape, crushed or other form may be added.

Among fillers except for the aforementioned (B) component, fillers (C) having a refractive index of 1.6 to 1.8 in (hereinafter sometimes referred to as "filler (C)") or fillers (D) having a refractive index of less than 1.6 or more than 1.8 and a average particle diameter of 30 μm or larger (hereinafter sometimes referred to as "filler (D)") are preferable. As filler (C), fibrous or plate aluminum hydrate (for example, such as gamma-alumina or the like) or fibrous or granular H glass having a fiber diameter not corresponding to the fiber diameter prescribed for the aforementioned (B) component.

As filler (D), in particular, glass flake and glass bead are preferable. Besides, the size of filler (D) is preferably 50 μm or larger, and more preferably 80 μm or larger. The upper limit of the size shall preferably be 1000 μm or less, in order to avoid gate clogging during the injection molding.

It should be noted that the refractive index is measured based on a method according to the total reflection critical angle by a Pulfrich refractometer, using a cubic test piece of a same composition of 10 mm square. The monofilament diameter is the value measured by the test method based on JIS-R3420 5,6. The average particle diameter is the average obtained by the micro track method where 0.70 g of sample is irradiated with laser beam after ethanol is added and ultrasonically dispersed for 3 min.

Besides, fillers except for the aforementioned glass fibers may be used in combination selecting two or more kinds thereof. As such combination of two or more kinds, for example, combination of fibrous gamma-alumina and glass bead, or fibrous H glass having a fiber diameter not corresponding to that of the aforementioned (B) component and glass flake, combination of plate gamma-alumina and granular H glass, combination of glass flake and glass bead and the like can be cited.

Fillers mentioned above may be used by treating the surface thereof with a well-known coupling agent (for example, silane-based coupling agents, titanate-based coupling agents) or other surface treatment agents.

The total compounding amount of filler (C) and/or filler (D) with respect to 100 parts by weight of PPS resin (A) may be 1 to 200 parts by weight, preferably 5 to 100 parts by weight, and more preferably 10 to 70 parts by weight, from a perspective of laser weldability, heat resistance, mechanical strength and the like. If the compounding amount of filler (C) and/or filler (D) is less than 1 part by weight, the improvement effect of heat resistance, mechanical strength and low warpage properties are not evident. On the contrary, if it is more than 200 parts by weight, it is not practical because the mechanical strength and fluidity deteriorate.

It should be noted that the total compounding amount of filler (C) and/or filler (D) for obtaining a PPS resin composition having a specific laser beam transmittance may be properly adjusted according to the kind of filler (C) and/or filler (D) and other conditions, in addition to the kind, monofilament diameter and compounding amount of the glass fiber (B).

(4) Amorphous Resin

Amorphous resin (E) may be added to the PPS resin composition for the purpose of improvement of laser weldability and low warpage.

As examples of amorphous resin (E), for instance, cycloolefin polymer, cycloolefin copolymer, polycarbonate, polyphenylene ether, polysulfone, polyethersulfone, polyarylate, polyetherimide, polyamideimide and the like can be cited. Among them, polyamideimide, polyarylate, polyethersulfone, polyetherimide, polysulfone, polyphenylether are preferable from a perspective of heat resistance and compatibility, and particularly preferable are polyamideimide, polyarylate, polyethersulfone, polyetherimide, polysulfone. Especially, polyamideimide (E1), polyetherimide (E2), polyethersulfone (E3) and polysulfone (E4) permit to obtain a significantly excellent laser transmittance, when finely dispersed in the PPS resin.

The compounding amount of amorphous resin (E) with respect to 100 parts by weight of PPS resin (A) is 0.1 to 200 parts by weight, preferably 1 to 150 parts by weight, and more preferably 1 to 70 parts by weight. It is possible to improve laser weldability, low warpage properties, heat resistance and mechanical strength and the like of the PPS resin composition in good balance by adopting such compounding amounts. If the compounding amount of amorphous resin (E) is less than 0.1 part by weight, the improvement effect of laser weldability and low warpage properties or the like can not be obtained, and, if more than 200 parts by weight, the heat resistance, mechanical strength and fluidity of the PPS resin composition deteriorate.

Besides, two or more kinds of the aforementioned amorphous resin (E) can be used in combination in order to balance the laser transmittance of the PPS resin composition and warpage properties of the molded product. The compounding amount of amorphous resin (E) for obtaining a PPS resin composition having a specific laser beam transmittance may be properly adjusted according to the kind of amorphous resin and other conditions.

(5) Silane Compound

A silane compound (F) may be added to the PPS resin composition for the purpose of improvement of laser weldability effect and mechanical strength and the like.

As silane compound (F), for instance, in addition to epoxysilane compounds, aminosilane compounds, ureidesilane compounds, isocyanatesilane compounds, various other kinds may be used. Besides, concrete examples of such silane compound (F) include, for instance, epoxy group containing alcoxysilane compounds such as gamma-glycidoxypropyl-trimethoxysilane, gamma-glycidoxypropyltriethoxysilane, beta-(3,4-epoxycyclohexyl)ethyltri-methoxysilane, mercapto group containing alcoxysilane compounds such as gamma-mercapto-propyl triemethoxysilane, gamma-mercaptopropyl triethoxysilane, ureido group containing alcoxysilane compounds such as gamma-ureidopropyl triethoxysilane, gamma-ureidoxypropyl triemethoxysilane, gamma-(2-ureidoethyl)aminopropyl trimethoxy-silane, isocianate group containing alcoxysilane compounds such as gamma-isocianatopropyl triethoxysilane, gamma-isocianatopropyl trimethoxysilane, gamma-isocianatopropyl methyldimethoxysilane, gamma-isocianatopropyl methyldiethoxysilane, gamma-isocianato-propyl etyldimethoxysilane, gamma-isocianatopropy ethyldiethoxysilane, gamma-isocianato-propyl trichlorosilane, amino group containing alcoxysilane compounds such as gamma-(2-aminoethyl) aminopropyl methyldimethoxysilane, gamma-(2-aminoethyl) aminopropyl trimethoxysilane, gamma-amino-propyl trimethoxy-silane, and hydroxy group containing alcoxysilane compounds such as gamma-hydroxypropyl trimethoxysilane, gamma-hydroxy-propyl triethoxysilane and the like.

The compounding amount of silane compound (F) with respect to 100 parts by weight of PPS resin (A) is 0.01 to 3. parts by weight, preferably 0.05 to 2 parts by weight, and more preferably 0.1 to 1 parts by weight. It is possible to improve laser weldability effect and mechanical strength in good balance by adding such silane compound. If the compounding amount of silane compound (F) is far less than 0.01 part by weight, the effect cannot be obtained, and, if more than 3 parts by weight, it causes a deterioration of fluidity and an increase of gas during the injection molding. Two or more kinds of the aforementioned silane compounds may be used in combination.

(6) Antioxidant

Antioxidant (G) may be added to the PPS resin composition. The addition of this antioxidant (G) permits to prevent the laser transmittance from lowering by the oxidation coloring.

Examples of such antioxidant (G) includes for example, calcium hypophosphite, phenolic compounds such as 2,6-di-t-butyl-4-methylphenol, tetrakis (methylene-3-(3,5-di-t-butyl-4-hydroxyphenil) propionate)methane, tris (3,5-di-t-butyl-4-hydroxybenzine) isocyanurate, sulfur compounds such as dilauryl-3,3'-thiodipropyonate, dimyristyl-3,3'-thiodipropinate, phosphorous compounds such as trisnonylphenyl phosphite, distearyl pentaerythritol diphosphite, and among others, calcium hypophosphite is preferable.

The compounding amount of antioxidant (G) with respect to 100 parts by weight of PPS resin (A) may be 0.01 to 3 parts by weight, preferably 0.05 to 2 parts by weight, and more preferably 0.1 to 1 parts by weight. In addition, two or more kinds of antioxidant may be used in combination.

(7) Elastomer

Elastomer (H) can be added to the PPS resin compositions. This addition of elastomer (H) improves the shock impact resistance and the cold and heat resistance of the PPS resin compositions.

Examples of the elastomer (H) are olefinic elastomer, modified olefinic elastomer, styrene elastomer and so on. Among them, olefinic elastomers include: polymers or copolymers obtained by polymerization of a kind or more kinds of ethylene, propylene, butene-1, pentene-1, 4-methylpentene-1, isobutylene or the like; and copolymers of alphaolefin, alpha, beta-unsaturated carbonic acid such as methyl acrylate, ethyl acrylate, butyl acrylate, methacrylic acid, methyl methacrylate, ethyl methacrylate and butyl methacrylate, and alkyl ester thereof. Concrete examples of olefinic elastomers are polyethylene, polypropylene, ethylene/propylene copolymer (hereinafter, "/" denotes co-polymerization), ethylene/butene-1 copolymer, ethylene/methyl acrylate copolymer, ethylene/ethyl acrylate copolymer, ethylene/butyl acrylate copolymer, ethylene/methyl methacrylate copolymer, ethylene/ethyl methacrylate copolymer, ethylene/butyl methacrylate copolymer, and so on.

Modified olefinic elastomers are obtained by introducing monomer component having functional group such as epoxy group, acid anhydride group and ionomer (hereinafter, referred to as functional group-containing component) into the aforementioned olefinic elastomers. This functional group containing component include: monomers containing acid anhydride group such as maleic anhydride, itaconic anhydride, citraconic anhydride, endobicyclo[2.2.1]5-heptene-2,3-dicarboxylic acid, endobicyclo[2.2.1]5-heptene-2,3-dicarboxylic anhydride; monomers containing epoxy group such as glycidyl acrylate, glycidyl methacrylate, glycidil ethacrylate, glycidyl itaconate, glycidyl citraconate; and monomers containing ionomers such as metal complex carboxylate.

Methods for introducing these functional group containing component are not especially limited and they include: copolymerization when olefinic (co)polymer similar to those used as the aforementioned olefinic elastomer is (co)polymerized; and graft-introduction to olefinic polymer using a radical initiator. It is proper that amount of introduced functional group containing component is within the range of 0.001 to 40 mol %, preferably 0.01 to 35 mol % to the entire olefin (co) polymer.

Olefin (co)polymers obtained by introducing monomer component having a functional group such as epoxy group, acidic anhydride group and ionomer into especially useful olefin polymers include: ethylene/propylene-g-glycidyl methacrylate copolymer (hereinafter, "g" referred as graft), ethylene/butane-1-g-glycidyl methacrylate copolymer, ethylene glycidyl acrylate copolymer, ethylene/glycidyl methacrylate copolymer, ethylene/methyl acrylate/glycidyl methacrylate copolymer, ethylene/methyl methacrylate/glycidyl methacrylate copolymer, ethylene/propylene-g-maleic anhydride copolymer, ethylene/butane-1-g-maleic anhydride copolymer, ethylene/methyl acrylate-g-maleic anhydride copolymer, ethylene/ethyl acrylate-g-maleic anhydride copolymer ethylene/methyl methacrylate-g-maleic anhydride copolymer, ethylene/ethyl methacrylate-g-maleic acid anhydride copolymer, zinc complex of ethylene/methacrylate copolymer, magnesium complex of ethylene/methacrylate copolymer and sodium complex of ethylene/methacrylate copolymer.

Preferable examples include, ethylene/glycidyl methacrylate copolymer, ethylene/metyl acrylate/glycidyl methacrylate copolymer, ethylene/metyl methacrylate/glycidyl methacrylate copolymer, ethylene/butene-1-g-maleic anhydride copolymer, ethylene/ethyl acrylate-g-maleic anhydride copolymer, and so on.

As especially preferable examples, ethylene/glycidyl methacrylate copolymer, ethylene/metyl acrylate/glycidyl methacrylate copolymer, ethylene/metyl methacrylate/glycidyl methacrylate copolymer, or the like can be cited.

On the other hand, concrete examples of styrene elastomers include styrene/butadiene copolymer, styrene/ethylene/butadiene copolymer, styrene/ethylene/propylene copolymer, styrene/isoprene copolymer and so on. Among them, styrene/butadiene copolymer is preferable. More preferably, epoxy copolymer of styrene/butadiene can be named.

The compound quantity of elastomer (H) is 0.5 to 20 parts by weight to 100 parts by weight of PPS resin (A), preferably 0.8 to 10 parts by weight thereto, and more preferably 1 to 6 parts by weight thereto. The compound quantity of elastomer (H) for obtaining PPS resin compositions having a specific laser transmittance may be adjusted according to the kind of elastomer and other conditions.

Besides, 2 or more kinds of the aforementioned elastomers can be used together, in order to have shock impact resistance, heat and cold resistance and laser transmittance in a balanced manner.

(8) Other Additives

Other additives can be added to the PPS resin compositions within the range not to reduce the advantageous effects of the invention. Those additives include: thermal stabilizers (hindered phenol family, hydroquinone family, phosphate family, substitutions thereof and so on); weather resistant agent (resorcinol family, salicylate family, benzotriazole family, benzophenone family, hindered amine family and so on); mold release agents and lubricants (montan acid, metal salt thereof, ester thereof and half ester thereof, stearyl alcohol, stearamide, various kinds of bisamide, bis-urea, polyethylene wax, and others); pigments (cadmium sulfide, phthalocyanine, carbon black for coloring, and so on), dyes (nigrosine and so on); nucleating agents for crystallization (talc, silica, kaolin, clay, polyether ether ketone, and so on); plasticizers (p-oxy octyl benzoate, N-butyl benzene sulfonamide, and so on); antistatic agents (alkyl sulfate type anionic antistatic agent, quaternary ammonium salt type cationic antistatic agent, nonionic antistatic agent such as polyoxyethylene sorbitan monostearate, betaine type amphoteric antistatic agent, and so on); flame retardants (red phosphorus, phosphate ester, melamine cyanurate, hydroxydes such as magnesium hydroxide and aluminum hydroxide, ammonium poplyphosphate, brominated polystyrene, brominated polyphenylene ether, brominated polycarbonate, brominated epoxy resin, or combination of these brominated flame retardants and antimony trioxide, or the like); and other polymers.

(9) Compounding of Respective Components

The PPS resin compositions can be produced by well-known methods. In short, they can be prepared by taking the aforementioned PPS resin (A) and glass fiber (B) as main components, selecting filler (C), filler (D), amorphous resin (B), silane compound (F), antioxidant (G) or elastamer (H) as arbitrary additive, and then mixing the main components and the selected additive beforehand, or without pre-mixing, feeding them to an extruder or the like where melting as well as kneading them sufficiently. Besides, it is preferable that glass fiber (B), fibrous/flaky filler (C) and fibrous/flaky filler (D) are supplied using the side feeder of an extruder in order to prevent fibrous/flaky breakage during melting/kneading, while PPS resin (A), filler (C) other than fibrous/flaky one, filler (D) other than fibrous/flaky one, amorphous resin (B), silane compound (F), antioxidant (G) and elastamer (H) are supplied through the main supply inlet of the extruder.

(10) PPS Resin Compositions

It is essential for the PPS resin compositions that the crystallization temperature during cooling is 205° C. or less, more preferably, 200° C. or less. Laser weldability can further be improved by lowering the crystallization temperature during cooling. The lower limit of crystallization temperature during cooling is not especially limited; however, it is preferable to set 170° C. as the lower limit, since excessive low temperature decreases the heat resistance.

In addition, for the PPS resin compositions, it is preferable that the chloroform-extractable content is 0.5 weight % or lower. This can improve the laser weldability furthermore. Still more preferably, the chloroform-extractable content is 0.3 weight % or less. The lower limit of the chloroform-extractable content is not especially limited, but should be within a range not to ruin the effect of laser weldability, heat resistance, mechanical strength, and so on.

When the PPS resin compositions is molded into 2 mm thick, the transmittance for laser beam having a wavelength of the 940 nm of the molded product is preferably 15% or higher, more preferably 17% or higher and especially preferably 20% or higher. Also, the heat distortion temperature of the molded product under a load of 1.82 MPa is preferably 230° C. or higher, more preferably 240° C. or higher and especially preferably 260° C. or higher.

The crystallization temperature during cooling, chloroform-extractable content, laser transmittance and heat distortion temperature of the PPS resin compositions are based on the following measuring method.

The crystallization temperature during cooling, chloroform-extractable content, laser transmittance and heat distortion temperature of the PPS resin compositions used for the present invention are based on the following measuring method.

The crystallization temperature during cooling is the temperature resulting from the PPS resin, obtained by sampling about 10 mg from a molded product, pellet, or crushed PPS resin compositions, heating it at the heating rate of 20 C.°/min, retaining at 340 C.° for 5 min, cooling it at the rate of 20 C.°/min and then measuring the crystallization peak (exothermic peak) temperature, using a differential scanning calorimeter (DSC-7 made by Perkin Elmer).

For the chloroform-extractable content, pellets of PPS resin compositions are frozen and crushed, then this crushed sample is classified with 32 to 60 mesh, washed five times with 30 ml of methanol to remove deposits, vacuum dried and after these processes 2 g of sample is measured. The sample of 2 g is wholly extracted under reflux with 20 g of chloroform at 85 C.° for 5 hours (Soxhlet extraction), using a Soxhlet extractor. Chloroform is collected and vacuum dried at 23 C.° for 1 hour. The measurement is performed by dividing the dry weight by the pre-extraction weight.

As for the laser transmittance, a test piece of 80 mm×80 mm×2 mm molded using an injection molding machine UH100 (made by Nissei Plascic Industrial Co., Ltd.) is used. The molding conditions thereof are 320 C.° cylinder temperature and the mold temperature of 130 C.°. An ultraviolet near infrared spectrophotometer (UV-3100) made by Shimadzu Corp. is used as test machine and an integrating sphere as detector. The laser transmittance is beam transmittance indicating in percentage the ratio of transmitted beam quantity to incident beam quantity when a laser beam of near infrared 940 nm wavelength transmits through a test piece of 2 mm thick.

The heat distortion temperature is the one of a computed test piece of 7 mm W×6.5 mm H×126 mm L, injection molded at 320 C.° of cylinder temperature and 130 C.° of mold temperature, using the injection molding machine UH100 (made by Nissei Plastic Industrial Co., Ltd.) which are measured according to ASTM-D648, under 1.82 MPa load.

(11) Molding and Applications of PPS Resin Composition

For the PPS resin composition, any of well-known molding methods of thermoplastic resin, such as injection molding, extrusion molding, compression molding, blow-molding, injection-compression molding, transfer molding, vacuum molding can be used. Among them, injection molding is especially preferable.

The obtained molded product, having an excellent laser weldability, can have an excellent performance as the molded product at the laser beam transmission side when the composite molded product is obtained by bonding 2 or more resin molded products in the laser welding method. Resin for the other side is not especially defined and it may be PPS resin, or resins other than PPS resin.

The applications of the composite molded product include, for instance, electrical and electronic application, automobile application, general miscellaneous goods application, construction material, and so on. To be more specific, it is useful for electronic component case of personal computer, liquid crystal projector, mobile equipment, cellular phone or the like, modules of switch or the like, parts for bonding in a remote controller, module products of electric equipment parts, module parts in engine room, throttle cover parts, intake manifold, underhood parts, radiator parts, cockpit module parts used for instrument panel or hollow container, covering box, parts of installed antenna requiring electromagnetic wave shield property in the other information and communication fields, or applications requiring a high dimensional accuracy for construction members, automobile parts application where the substitution of metals is desired for weight saving or the like, molded product used by laser welding for electrical and electronic component application, and so on. As the composite molded product has an excellent weld strength, on laser welding bonding resin molded product for various application, it is especially useful for the molded product at the laser beam transmission side.

The PPS resin composition, having an excellent laser transmissive property, permits to obtain a satisfactory bonding force, even if the thickness of the transmission part of its welding site in which laser beam transmits is in the relatively thick range of 5 mm or less. Among others, a stronger bonding force can be obtained if 3 mm or less, especially 2 mm or less and further 1.5 mm or less. It should be noted that it is preferable the lower limit thickness is 0.1 mm, especially 1 mm, in order to obtain practical molded product strength and productivity, or in order to obtain such a degree of freedom of composition design that permits to add another function by adding an additive to the composition.

In case of obtaining the molded product of PPS resin composition by injection molding, it is possible to lower the mold temperature. By lowering the mold temperature, the transmittance for laser beam of the PPS resin composition molded product can be improved. The mold temperature is preferably 100° C. or lower and more preferably, it can be set to 80° C. or lower. It should be noted that the lower limit of the mold temperature is preferably 40° C., because the molding in a low-temperature mold accompanies the loss of flowability of resin and the defective appearance of the molded product, and so on.

The other resin molded product is not especially limited when laser welding a composite molded product using a molded product of PPS resin composition as the molded product at the laser beam absorption side; however, preferably, it contains PPS resin. Also, it is preferable that the composite molded product obtained by laser welding the molded product of PPS resin composition of the present invention is heat-treated after laser welding. This heat-treating permits to improve the dimensional stability, mechanical strength or the like after the laser welding. It is especially effective in case where the molded product at the laser beam transmission side is obtained at the mold temperature of 100° C. or lower.

EXAMPLES

Our compositions shall be described more particularly by means of embodiments and comparative examples. These are illustrated only as examples, and the compositions are not limited to the above.

PPS resin, glass fiber and other compounding components and comparative examples described below are selected from the following groups of material (1) to (7).

(1) PPS Resin a. PPS-1:

Sodium sulfide 9 hydrobase 6.005 kg (25 mol), sodium acetate 0.787 kg (9.6 mol) and NMP 5 kg are thrown in an autoclave with agitator, heated gradually to 205° C. introducing nitrogen, and water of 3.6 litter is distilled. Next, the reaction vessel is cooled to 180° C., and 1,4-dichlorobenzen 3.712 kg (25.25 mol) and NMP 2.4 kg are added, sealed under nitrogen, heated to 270° C., and thereafter, let react at 270° C. for 2.5 hours. Next, the above is thrown in NMP 10 kg that is heated to 100° C., agitated continuously for about one hour and filtered, and washed three times for 30 minutes with hot water of 80° C. This is filtered, thrown in 25 litter of aqueous solution containing calcium acetate 10.4 g, agitated continuously for about one hour at 192° C. in a sealed autoclave, filtered, washed with ion exchange water of about 90° C. until the filtrate pH becomes 7, and dried for 24 hours at 80° C. under reduced pressure, to obtain PPS-1 of 180° C. in crystallization temperature during cooling, 0.30 weight % in chloroform-extractable content, and 100 g/10 minutes in MFR.

It should be noted that MFR is measured under a load of 5 kg (based on JIS-K7210), after having dried 5 g of PPS resin powder at 130° C. for three hours and retained at 315.5° C. for 5 minutes.

b. PPS-2:

Sodium sulfide 9 hydrobase 6.005 kg (25 mol), sodium acetate 0.656 kg (8 mol) and NMP 5 kg are thrown in an autoclave with agitator, heated gradually to 205° C. introducing nitrogen, and water of 3.6 litter is distilled. Next, the reaction vessel is cooled to 180° C., 1,4-dichlorobenzen 3.712 kg (25.25 mol) and NMP 2.4 kg are added, sealed under nitrogen, heated to 270° C., and thereafter, let react at 270° C. for 2.5 hours. Next, the above is thrown in NMP 10 kg that is heated to 100° C., agitated continuously for about one hour and filtered, and washed three times for 30 minutes with hot water of 80° C. This is filtered, thrown in 25 litter of aqueous solution containing calcium acetate 10.4 g, agitated continuously for about one hour at 192° C. in a sealed autoclave, filtered, washed with ion exchange water of about 90° C. until the filtrate pH becomes 7, and dried for 24 hours at 80° C. under reduced pressure, to obtain PPS-2 of 185° C. in crystallization temperature during cooling, 0.4 weight % in chloroform-extractable content and 60 g/10 minutes in MFR.

c. PPS-3:

Sodium sulfide 9 hydrobase 6.005 kg (25 mol), sodium acetate 0.761 kg (9.28 mol) and NMP 5 kg are thrown in an autoclave with agitator, heated gradually to 205° C. introducing nitrogen, and water of 3.6 litter is distilled. Next, the reaction vessel is cooled to 180° C., 1,4-dichlorobenzen 3.712 kg (25.25 mol), 1,3,5-trichlorobenzen 3.27 kg (0.018 mol) and NMP 2.4 kg are added, sealed under nitrogen, heated to 270° C., and thereafter, let react at 270° C. for 2.5 hours. Next, the above is thrown in NMP 10 kg that is heated to 100° C., agitated continuously for about one hour and filtered, and washed three times for 30 minutes with hot water of 80° C. This is filtered, thrown in 25 litter of aqueous solution containing calcium acetate 10.4 g, agitated continuously for about one hour at 192° C. in a sealed autoclave, filtered, washed with ion exchange water of about 90° C. until the filtrate pH becomes 7, and dried for 24 hours at 80° C. under reduced pressure, to obtain PPS-3 of 180° C. in crystallization temperature during cooling, 0.4 weight % in chloroform-extractable content and 70 g/10 minutes in MFR.

c. PPS-4:

Sodium sulfide 9 hydrobase 6.005 kg (25 mol), sodium acetate 0.69 kg (98.25 mol) and NMP 4.1 kg are thrown in an autoclave with agitator, heated gradually to 205° C. introducing nitrogen, and water of 3.6 litter is distilled. Next, the reaction vessel is cooled to 180° C., p-dichlorobenzen 3.582 kg (24.4 mol), m-dichlorobenzen 0.188 kg (1.28 mol) and NMP 3.2 kg are added, sealed under nitrogen, heated to 270° C., and thereafter, let react at 270° C. for 2.5 hours. Next, the above is thrown in NMP 10 kg that is heated to 100° C., agitated continuously for about one hour and filtered, and washed three times for 30 minutes with hot water of 80° C. This is filtered, dried for 24 hours at 80° under reduced pressure, to obtain PPS-4 of 5 mol % in m-phenylene sulfide unit to the total of m-phenylene sulfide and p-phenylene sulfide, 180° in crystallization temperature during cooling, 0.5 weight % in chloroform-extractable content and 160 g/10 minutes in MFR.

d. PPS-5:

Sodium sulfide 9 hydrobase 6.005 kg (25 mol), sodium acetate 0.656 kg (8 mol) and NMP 5 kg are thrown in an autoclave with agitator, heated gradually to 205° C. introducing nitrogen, and water of 3.6 litter is distilled. Next, the reaction vessel is cooled to 180° C., 1,4-dichlorobenzen 3.756 kg (25.55 mol) and NMP 2.4 kg are added, sealed under nitrogen, heated to 270°, and thereafter, let react at 270° C. for 2.5 hours. Next, the above is thrown in NMP 10 kg that is heated to 100° C., agitated continuously for about one hour and filtered, and washed three times for 30 minutes with hot water of 80° C. This is thrown in 25 litter of acetic acid aqueous solution of pH 4 that is heated to 90°, agitated continuously for about one hour, washed with ion exchange water of about 90° C. until the filtrate pH becomes 7, and dried for 24 hours at 80° C. under reduced pressure, to obtain PPS-5 of 215° C. in crystallization temperature during cooling, 0.5 weight % in chloroform-extractable content and 300 g/10 minutes in MFR.

e. PPS-6:

Sodium sulfide 9 hydrobase 6.005 kg (25 mol) and NMP 5 kg are thrown in an autoclave with agitator, heated gradually to 205° C. introducing nitrogen, and water of 3.6 litter is distillated. Next, the reaction vessel is cooled to 180° C., 1,4-dichlorobenzen 3.763 kg (25.6 mol) and NMP 1.8 kg are added, sealed under nitrogen, heated to 274° C., and let react at 274° C. for 0.8 hours. A drain valve installed in the lower part of the autoclave is opened at room temperature and normal pressure to extract the contents, which are washed with hot water of 80° C. This is filtered, thrown in 25 litter of aqueous solution containing calcium acetate 10.4 g, agitated continuously for about one hour at 192° C. in a sealed autoclave, filtered, washed with ion exchange water of about 90° C. until the filtrate pH becomes 7, and the polymer is dried at 120° C. for 8 hours, heated thereafter at 215° C., to obtain PPS-6 of 215° C. in crystallization temperature during cooling, 2.5 weight % in chloroform-extractable content and 300 g/10 minutes in MFR.

f. PPS-7:

PPS resin M3910 made by TORAY (210° C. in crystallization temperature during cooling, 3.0 weight % in chloroform-extractable content, and 3000 g/10 minutes in MFR)

(2) Glass Fiber a. Glass fiber (GF1):

T-747 H (Nippon Electric Glass) E glass, monofilament diameter 10.5 μm, refractive index ($n_D$) 1.55 b. Glass fiber (GF2):

T-747 (Nippon Electric Glass) E glass, monofilament diameter 13 μm, refractive index ($n_D$) 1.55 c. Glass fiber (GF3):

T-747 N (Nippon Electric Glass) E glass, monofilament diameter 17 μm, refractive index ($n_D$) 1.55 d. Glass fiber (GF4):

T-747 T (Nippon Electric Glass) E glass, monofilament diameter 23 μm, refractive index ($n_D$) 1.55 e. Glass fiber (GF5):

T-717 G (Nippon Electric Glass) E glass, monofilament diameter 9.5 μm, refractive index ($n_D$) 1.55

(3) Fillers Other than Glass Fiber a. Glass flake (GFL):

REFG311 (flaky filler, SNG petrotex) E glass, average particle diameter obtained by micro-track method is 58 μm. Refractive index ($n_D$) 1.55 b. Glass bead (GB1):

EGB731B2 (made by Potters-Ballotini Co., Ltd.) E glass, average particle diameter: 20 μm (Micro-track method), refractive index ($n_D$) 1.55 c. Glass bead (GB2):

J-54 (made by Potters-Ballotini Co., Ltd.) A glass, average particle diameter: 300 μm (Micro-track method), refractive index ($n_D$) 1.52 d. E Glass crushed product (EG):

E glass (made by Nippon Electric Glass) is crushed by Henschel mixer, sieved by 63 μm pass, and 9.5 μm undercut to obtain EG with 20 μm in average particle diameter (Micro-track method). Refractive index ($n_D$) 1.55 e. H Glass crushed product (HG1):

H glass (made by Nippon Electric Glass) is crushed by Henschel mixer, sieved by 63 μm pass, and 9.5 μm undercut to obtain HG1 with 20 μm in average particle diameter (Micro-track method). Refractive index ($n_D$) 1.74 f. H Glass crushed product (HG2):

H glass (made by Nippon Electric Glass) is crushed by Henschel mixer, sieved by 355 μm pass, and 45 μm undercut to obtain HG2 with 150 μm in average particle diameter (Micro-track method). Refractive index ($n_D$) 1.74 g. Alumina hydrate (BM1):

"Terracess" BMT33 (made by OTSUKA Chemical Co., Ltd.) γ-alumina.1 hydrate, plate-shape, 5 μm in average particle diameter (Micro-track method), refractive index ($n_D$) 1.66 h. Burned substance of alumina hydrate (BM2):

"Terracess" BMT33-B (made by OTSUKA Chemical Co., Ltd.) γ-alumina, plate-shape, 5 μm in average particle diameter (Micro-track method), refractive index ($n_D$) 1.68 i. Alumina hydrate (BM3):

"Terracess" BMI (made by OTSUKA Chemical Co., Ltd.) γ-alumina.1 hydrate, whisker-shape, 7 μm in average particle diameter (Micro-track method), refractive index ($n_D$) 1.66

It should be noted that 335 μm pass means passage through the corresponding sieve, and 9.5 μm undercut means failed passage through the corresponding sieve.

(4) Amorphous Resin a. Polyamide-imide (PAI):

It is synthesized by acid chloride low temperature solution polymerization method, using N,N-dimethylacetoamide as polymerization solvent. The detail thereof is shown below.

12 kg of diamino diphenylether (DDE) and 2.0 kg of methaphenilene diamine (MPDA) are dissolved in 65 litters of N,N-dimethylacetoamide (DMAC), and 15 kg of powder trimellitic anhydride monochloride (TMAC) is added by such a speed that the inner temperature does not exceed 30° C. by cooling with ice bath. After having added the whole TMAC, 1.7 kg of trimellitic anhydride (TMA) is added, agitated, and retained at 30° C. for two hours. The viscous polymerization solution is introduced in a cutter mixer filled with water of 100 litters and agitated at a high speed to separate out slurry like polymer. Thus obtained slurry is dehydrated by a centrifugal separator. Dehydrated cake is washed with water of 20 litters at 60° C., and dehydrated again with the centrifugal separator. Thus obtained cake is dried at 220° C. for five hours using a hot air drier, to obtain powder polymer of glass transition temperature (Tg)=275° C.

b. Polyetherimide (PEI)

"ULTEM" 1010 (made by GE Plastics Japan), glass transition temperature (Tg)=215° C.

c. Polyether sulfone (PES):

"SUMIKAEXCEL" 3600P (made by Sumitomo Chemical Co., Ltd.), glass transition temperature (Tg)=220° C.

d. Polysulfone (PSU):

"UDEL" P-1700 (made by Amoco Engineering Polymers Co., Ltd.), glass transition temperature (Tg)=190° C.

e. Polyarylate (PAR):

"U-polymer" U-100 (made by Unitika), glass transition temperature (Tg)=195° C.

It should be noted that the glass transition temperature is obtained at the heating rate of 20°/minute using a differential scanning calorimeter (DSC-7: made by Parkin Elmer).

(5) Silane Compound a. Silane compound:

"KBM303" (made by Shinetsu Chemical Co., Ltd.) β-(3,4-epoxy cyclohexyl) ethyltrimethoxysilane (6) Antioxidant
   a. Antioxidant:

"Calcium hypophosphite" (made by Taihei Chemical Industry Co., Ltd.)

(7) Elastomer
   a. Elastomer-1 (ER-1):

"BF-E" (Sumitomo Chemical Industry Co., Ltd.) ethylene/glycidyl methacrylate=97.6/2.4 (mol %) copolymer.
   b. Elastomer-2 (ER-2):

"Tafmer A4085" (Mitsui Chemicals) ethylene/butene-1= 90.8/9.2 (mol %) copolymer

Also, performances of PPS resin composition obtained by embodiments and comparative examples explained below are evaluated by the measurement method described in the following (1) to (4).

(1) Warpage Property

A square plate of 80 mm×80 mm×1 mm thickness is manufactured by using an injection molding machine UH1000 (Nissei Resin Industry Co., Ltd.). The molding condition is 320° C. for cylinder temperature (resin temperature 310° C. for the example described in Table 5) and 130° C. for the mold temperature. The warpage property, when it is heat-treated at 130° C. for one hour, is evaluated.

For the evaluation, one of four sides of the square plate is pressed, and the warping is evaluated as A if less than 0.8 mm, B if less than 1 mm, C if less than 1 mm, D if less than 3 mm, and E if 3 mm or more.

(2) Laser Weld Strength Evaluation

A laser transmissive property evaluation test piece of 80 mm×80 mm×2.0 mm thickness is manufactured by using an injection molding machine UH1000 (Nissei Resin Industry Co., Ltd.). The molding condition is 320° C. for cylinder temperature and 130° C. for the mold temperature. Furthermore, the test piece is worked into 24 mm×70 mm×2.0 mm, 24 mm×70 mm×2.5 mm, 24 mm×70 mm×3.5 mm, 24 mm×70 mm×4.5 mm, and 24 mm×70 mm×5.0 mm respectively, according to the evaluation thickness 2.0 mm, 2.5 mm, 3.5 mm, 4.5 mm, and 5.0 mm, the sample for transmission and the sample at the absorption side are superposed for setting the length L to 30 mm, the laser weld distance Y is set to 20 mm, and the laser welding is performed, to measure the tensile break strength.

It should be noted that the welding conditions and the weld strength measurement conditions are as follows.

The laser welding is performed with conditions permitting to obtain the best weld strength within a range of 15 to 35 W for output and within a range of 1 to 50 mm/sec for laser scanning speed, using MODULASC made by Leister. It should be noted that the focal length is fixed at 38 mm and the focal diameter is fixed at 0.6 mm. In addition, a general tensile tester (AG-500B) is used for measuring the weld strength, both ends of the test piece are fixed, and the tensile test is executed so that tensile shearing stress generates in the welding site. The tensile speed is 1 mm/minute and the span is 40 mm for measuring the strength. The weld strength is taken as the stress when the welding site is broken. It should be noted that thermoplastic resin composition is used for the laser transmission sample, and material where 0.4 parts of carbon black is added further to the sample at the transmission side respectively is used for the sample at the laser absorption side.

(3) Cold and Heat Resistance

A cold and heat resistance evaluation test piece is manufactured by fixing a metal piece of 47.0 mm length×47.0 mm width×28.6 mm height in the mold, and over-molding resin with 1.5 mm thickness around the outer periphery of the metal piece, using the injection molding machine UH1000 (Nissei Resin Industry Co., Ltd.). The molding condition is 320° C. (resin temperature is 310° C. for the example described in Table 5) for cylinder temperature and 130° C. for the mold temperature. THERMAL SHOCK CHANBER TSA-100S-W type (made by TABAY) is used for evaluation, the test piece is exposed to 130° C. (high temperature side) and −40° C. (low temperature side) respectively for one hour as one cycle, the number of cycles until crack is generated is visually determined, and it is evaluated as A if the average number of cycles when N=3 is 1000 cycles or more, B if 500 cycles or more, C if 300 cycles or more, D if 30 cycles or more, and E if less than 30 cycles.

(4) Heat Resistance

A test piece of 12.7 mm×12.7 mm×3.2 mm thickness is manufactured at the resin temperature of 310° C. and at the mold temperature shown in Table 1 by using the injection molding machine UH1000 (Nissei Resin Industry Co., Ltd.), and the deflection temperature under load is evaluated under 0.46 MPa load, according to ASTM D648.

Embodiments 1-30, Comparative Examples 1-7

Respective materials from PPS resin group described in (1), glass fiber group described in (2), filler group other than glass fiber described in (3), amorphous resin group described in (4), silane compound described in (5) and antioxidant described in (6) mentioned above are selected with the combination and quantity described in Table 1 to 3, compounded, and pelletized respectively by the double shaft extruder PCM with 3 hole strand mold head at the resin temperature of 310° C. to prepare pellet of PPS resin composition. Molded products for respective evaluation tests were prepared from these pellets of PPS resin composition for the evaluation of crystallization temperature during cooling, chloroform-extractable content, laser transmissivity, heat distortion temperature and, at the same time, laser weld strength and warpage property, to obtain results shown in Table 1 to 3.

Embodiments 31-52

As mentioned above, respective materials from PPS resin group described in (1), glass fiber group described in (2), filler group other than glass fiber described in (3), amorphous resin group described in (4), silane compound described in (5) and antioxidant described in (6) are selected with the combination and quantity described in Table 4, compounded, and pelletized respectively by the double shaft extruder PCM with 3 hole strand mold head at the resin temperature of 310° C. to prepare pellet of PPS resin composition.

The crystallization temperature during cooling, chloroform-extractable content, laser transmissivity, heat distortion temperature and, at the same time, laser weld strength and warpage property of these pellets of PPS resin composition were evaluated respectively, to obtain results shown in Table 4.

Embodiments 53-55

Respective materials from PPS resin group described in (1), glass fiber group described in (2), silane compound described in (5), antioxidant described in (6), and elastomer group described in (7) mentioned above are selected with the combination and quantity described in Table 5, compounded, and pelletized respectively by the double shaft extruder PCM with 3 hole strand mold head at the resin temperature of 310° C. to prepare pellet of PPS resin composition. The crystallization temperature during cooling, chloroform-extractable content, laser transmissivity, heat distortion temperature and, at the same time, laser weld strength, warpage property, and cold and heat resistance of these pellets of PPS resin composition were evaluated respectively, to obtain results shown in Table 5. It should be noted that results of the aforementioned embodiments 5 and 27 are also described in Table 5.

Embodiment 56

Respective materials from PPS resin group described in (1) and glass fiber group described in (2) mentioned above are selected with the combination and quantity described in Table 4, compounded, and pelletized respectively by the double shaft extruder PCM with 3 hole strand mold head at the resin temperature of 310° to prepare pellet of PPS resin composition.

Test pieces were injection-molded at the mold temperature of 80°, and the crystallization temperature during cooling, chloroform-extractable content, laser transmissivity, heat distortion temperature and, at the same time, laser weld strength and warpage property of these pellets of PPS resin composition were evaluated respectively, to obtain results shown in Table 6. It should be noted that results of the aforementioned embodiments 5 and 9 are also described in Table 6.

Embodiments 57-81, Comparative Examples 8-10

Respective materials from PPS resin group described in (1), glass fiber group described in (2), filler group other than glass fiber described in (3), amorphous resin group described in (4), antioxidant described in (6), and elastomer group described in (7) mentioned above are selected with the combination and quantity described in Tables 7-9, compounded, and pelletized respectively by the double shaft extruder PCM with 3 hole strand mold head at the resin temperature of 310° C. to prepare pellet of PPS resin composition.

The crystallization temperature during cooling and, at the same time, laser weld strength, warpage property, heat resistance, and cold and heat resistance of these pellets of PPS resin composition were evaluated respectively, to obtain results shown in Table 7 to 9. It should be noted that results of the aforementioned embodiment 31 are also described in Table 7 and 8.

INDUSTRIAL APPLICABILITY

Our PPS resin compositions can be used effectively for laser weld bonding of resin molded products in various applications such as electrical and electronic equipment, precision instrument concerning equipment, office equipment, automobile and vehicle concerning parts, construction material, wrapping material, furniture, daily goods and so on.

TABLE 1

|  | PPS resin (parts by weight) | Glass fiber (parts by weight) | Filler equal or superior to 1.6 and less than 1.8 in reflective index (parts by weight) | Filler less than 1.6 or equal or superior to 1.8 in reflective index (parts by weight) | Amorphous resin (parts by weight) | Silane compound (parts by weight) | Antioxidant (parts by weight) | Mold temperature (° C.) |
|---|---|---|---|---|---|---|---|---|
| Embodiment 1 | PPS1(100) | GF1(30) |  |  |  |  |  | 130 |
| Embodiment 2 | PPS2(100) | GF1(30) |  |  |  |  |  | 130 |
| Embodiment 3 | PPS3(100) | GF1(30) |  |  |  |  |  | 130 |
| Embodiment 4 | PPS4(100) | GF1(30) |  |  |  |  |  | 130 |
| Embodiment 5 | PPS1(100) | GF2(30) |  |  |  |  |  | 130 |
| Embodiment 6 | PPS1(100) | GF3(30) |  |  |  |  |  | 130 |
| Embodiment 7 | PPS1(100) | GF4(30) |  |  |  |  |  | 130 |
| Embodiment 8 | PPS1(100) | GF1(80) |  |  |  |  |  | 130 |
| Embodiment 9 | PPS1(100) | GF3(80) |  |  |  |  |  | 130 |
| Comparative Example 1 | PPS5(100) | GF2(30) |  |  |  |  |  | 130 |
| Comparative Example 2 | PPS6(100) | GF2(30) |  |  |  |  |  | 130 |
| Comparative Example 3 | PPS7(100) | GF2(30) |  |  |  |  |  | 130 |
| Comparative Example 4 | PPS1(100) | GF5(30) |  |  |  |  |  | 130 |
| Comparative Example 5 | PPS1(100) | GF2(200) |  |  |  |  |  | 130 |
| Comparative Example 6 | PPS1(100) |  |  |  |  |  |  | 130 |
| Comparative Example 7 | PPS1(100) |  |  | GB2(30) |  |  |  | 130 |

|  | Crystallization temperature during cooling (° C.) | Chloroform-extractable content (weight %) | Laser permeability (%) | Heat distortion temperature (° C.) | Laser weld strength (2.0 mm thick) (MPa) | Warpage property |
|---|---|---|---|---|---|---|
| Embodiment 1 | 190 | 0.18 | 20 | 260 | 45 | D |
| Embodiment 2 | 195 | 0.25 | 17 | 260 | 40 | D |
| Embodiment 3 | 190 | 0.25 | 18 | 260 | 42 | D |
| Embodiment 4 | 190 | 0.31 | 20 | 245 | 43 | D |

TABLE 1-continued

|  | | | | | | | |
|---|---|---|---|---|---|---|---|
| Embodiment 5 | 190 | 0.18 | 22 | 260 | 45 | D |
| Embodiment 6 | 190 | 0.18 | 27 | 260 | 45 | D |
| Embodiment 7 | 190 | 0.18 | 30 | 255 | 45 | D |
| Embodiment 8 | 192 | 0.13 | 16 | 260 | 40 | B |
| Embodiment 9 | 192 | 0.13 | 22 | 260 | 45 | B |
| Comparative Example 1 | 225 | 0.31 | 9 | 260 | Not welded | D |
| Comparative Example 2 | 225 | 1.54 | 4 | 260 | Not welded | D |
| Comparative Example 3 | 220 | 1.85 | 6 | 260 | Not welded | D |
| Comparative Example 4 | 190 | 0.18 | 11 | 260 | 30 | D |
| Comparative Example 5 | 200 | 0.10 | 4 | 260 | Not welded | B |
| Comparative Example 6 | 185 | 0.24 | 39 | 105 | 41 | E |
| Comparative Example 7 | 190 | 0.18 | 27 | 135 | 43 | E |

TABLE 2

|  | PPS resin (parts by weight) | Glass fiber (parts by weight) | Filler equal or superior to 1.6 and less than 1.8 in reflective index (parts by weight) | Filler less than 1.6 or equal or superior to 1.8 in reflective index (parts by weight) | Amorphous resin (parts by weight) | Silane compound (parts by weight) | Antioxidant (parts by weight) | Mold temperature (° C.) |
|---|---|---|---|---|---|---|---|---|
| Embodiment 10 | PPS1(100) | GF2(30) |  | GFL(10) |  |  |  | 130 |
| Embodiment 11 | PPS1(100) | GF2(30) |  | GB1(10) |  |  |  | 130 |
| Embodiment 12 | PPS1(100) | GF2(30) |  | GB2(10) |  |  |  | 130 |
| Embodiment 13 | PPS1(100) | GF2(30) |  | EG(10) |  |  |  | 130 |
| Embodiment 14 | PPS1(100) | GF2(30) | HG1(10) |  |  |  |  | 130 |
| Embodiment 15 | PPS1(100) | GF2(30) | HG2(10) |  |  |  |  | 130 |
| Embodiment 16 | PPS1(100) | GF2(30) | BM1(10) |  |  |  |  | 130 |
| Embodiment 17 | PPS1(100) | GF2(30) | BM2(10) |  |  |  |  | 130 |
| Embodiment 18 | PPS1(100) | GF2(30) | BM3(10) |  |  |  |  | 130 |
| Embodiment 19 | PPS1(100) | GF2(20) |  | GFL(10)/GB2(10) |  |  |  | 130 |
| Embodiment 20 | PPS1(100) | GF2(20) | HG2(10)/BM3(10) |  |  |  |  | 130 |
| Embodiment 21 | PPS1(100) | GF2(20) | BM3(10) | GB2(10) |  |  |  | 130 |
| Embodiment 22 | PPS1(100) | GF2(30) |  |  | PAI(5) |  |  | 130 |
| Embodiment 23 | PPS1(100) | GF2(30) |  |  | PAI(20) |  |  | 130 |
| Embodiment 24 | PPS1(100) | GF2(30) |  |  | PEI(5) |  |  | 130 |
| Embodiment 25 | PPS1(100) | GF2(30) |  |  | PES(5) |  |  | 130 |
| Embodiment 26 | PPS1(100) | GF2(30) |  |  | PSU(5) |  |  | 130 |

|  | Crystalliza-tion temperature during cooling (° C.) | Chloroform-extractable content (weight %) | Laser permeability (%) | Heat distortion temperature (° C.) | Laser deposition strength (2.0 mm thick) (MPa) | Warpage property |
|---|---|---|---|---|---|---|
| Embodiment 10 | 190 | 0.17 | 18 | 260 | 42 | A |
| Embodiment 11 | 190 | 0.17 | 16 | 260 | 40 | C |
| Embodiment 12 | 190 | 0.17 | 18 | 260 | 42 | C |
| Embodiment 13 | 190 | 0.17 | 16 | 260 | 40 | C |
| Embodiment 14 | 190 | 0.17 | 18 | 260 | 42 | C |
| Embodiment 15 | 190 | 0.17 | 20 | 260 | 45 | C |
| Embodiment 16 | 190 | 0.17 | 18 | 260 | 42 | B |
| Embodiment 17 | 190 | 0.17 | 20 | 260 | 45 | B |
| Embodiment 18 | 190 | 0.17 | 19 | 260 | 42 | B |
| Embodiment 19 | 190 | 0.17 | 16 | 260 | 40 | A |
| Embodiment 20 | 190 | 0.17 | 19 | 260 | 42 | B |
| Embodiment 21 | 190 | 0.17 | 18 | 260 | 42 | B |
| Embodiment 22 | 191 | 0.22 | 25 | 260 | 45 | B |
| Embodiment 23 | 191 | 0.25 | 25 | 260 | 45 | A |
| Embodiment 24 | 189 | 0.22 | 23 | 260 | 45 | B |
| Embodiment 25 | 189 | 0.22 | 23 | 260 | 45 | B |
| Embodiment 26 | 189 | 0.24 | 23 | 260 | 45 | B |

TABLE 3

| | PPS resin (parts by weight) | Glass fiber (parts by weight) | Filler equal or superior to 1.6 and less than 1.8 in reflective index (parts by weight) | Filler less than 1.6 or equal or superior to 1.8 in reflective index (parts by weight) | Amorphous resin (parts by weight) | Silane compound (parts by weight) | Antioxidant (parts by weight) | Mold temperature (° C.) |
|---|---|---|---|---|---|---|---|---|
| Embodiment 5 | PPS1(100) | GF2(30) | | | | | | 130 |
| Embodiment 27 | PPS1(100) | GF2(30) | | | | 0.2 | | 130 |
| Embodiment 28 | PPS1(100) | GF2(30) | | | | | 0.5 | 130 |
| Embodiment 29 | PPS1(100) | GF2(30) | | | | 0.2 | 0.5 | 130 |
| Embodiment 30 | PPS1(100) | GF2(30) | | | PAI(5) | 0.2 | 0.5 | 130 |

| | Crystallization temperature during cooling (° C.) | Chloroform-extractable content (weight %) | Laser permeability (%) | Heat distortion temperature (° C.) | Laser weld strength (3.5 mm thick) (MPa) | Warpage property |
|---|---|---|---|---|---|---|
| Embodiment 5 | 190 | 0.18 | 22 | 260 | 42 | D |
| Embodiment 27 | 188 | 0.18 | 24 | 260 | 45 | D |
| Embodiment 28 | 190 | 0.18 | 24 | 260 | 45 | D |
| Embodiment 29 | 188 | 0.18 | 25 | 260 | 45 | D |
| Embodiment 30 | 189 | 0.22 | 27 | 260 | 45 | B |

TABLE 4

| | PPS resin (parts by weight) | Glass fiber (parts by weight) | Filler equal or superior to 1.6 and less than 1.8 in reflective index (parts by weight) | Filler less than 1.6 or equal or superior to 1.8 in reflective index (parts by weight) | Amorphous resin (parts by weight) | Silane compound (parts by weight) | Antioxidant (parts by weight) |
|---|---|---|---|---|---|---|---|
| Embodiment 31 | PPS1(100) | GF3(60) | | | | | |
| Embodiment 6 | PPS1(100) | GF3(30) | | | | | |
| Embodiment 32 | PPS1(100) | GF3(30) | | GFL(10) | | | |
| Embodiment 33 | PPS1(100) | GF3(30) | | GB1(10) | | | |
| Embodiment 34 | PPS1(100) | GF3(30) | | GB2(10) | | | |
| Embodiment 35 | PPS1(100) | GF3(30) | | EG(10) | | | |
| Embodiment 36 | PPS1(100) | GF3(30) | HG1(10) | | | | |
| Embodiment 37 | PPS1(100) | GF3(30) | HG2(10) | | | | |
| Embodiment 38 | PPS1(100) | GF3(30) | BM1(10) | | | | |
| Embodiment 39 | PPS1(100) | GF3(30) | BM2(10) | | | | |
| Embodiment 40 | PPS1(100) | GF3(30) | BM3(10) | | | | |
| Embodiment 41 | PPS1(100) | GF3(20) | | GFL(10)/GB2(10) | | | |
| Embodiment 42 | PPS1(100) | GF3(20) | HG2(10)/BM3(10) | | | | |
| Embodiment 43 | PPS1(100) | GF3(20) | BM3(10) | GB2(10) | | | |
| Embodiment 44 | PPS1(100) | GF3(30) | | | PAI(5) | | |
| Embodiment 45 | PPS1(100) | GF3(30) | | | PAI(20) | | |
| Embodiment 46 | PPS1(100) | GF3(30) | | | PEI(5) | | |
| Embodiment 47 | PPS1(100) | GF3(30) | | | PES(5) | | |
| Embodiment 48 | PPS1(100) | GF3(30) | | | PSU(5) | | |
| Embodiment 49 | PPS1(100) | GF3(30) | | | | 0.2 | |
| Embodiment 50 | PPS1(100) | GF3(30) | | | | | 0.5 |
| Embodiment 51 | PPS1(100) | GF3(30) | | | | 0.2 | 0.5 |
| Embodiment 52 | PPS1(100) | GF3(30) | | | PAI(5) | 0.2 | 0.5 |

| | Mold temperature (° C.) | Crystallization temperature during cooling (° C.) | Chloroform extraction quantity (weight %) | Laser permeability (%) | Heat distortion temperature (° C.) | Laser weld strength (4.5 mm thick) MPa) | Warpage property |
|---|---|---|---|---|---|---|---|
| Embodiment 31 | 130 | 191 | 0.15 | 24 | 260 | 38 | B |
| Embodiment 6 | 130 | 190 | 0.18 | 27 | 260 | 40 | D |
| Embodiment 32 | 130 | 190 | 0.17 | 23 | 260 | 37 | A |
| Embodiment 33 | 130 | 190 | 0.17 | 21 | 260 | 33 | C |
| Embodiment 34 | 130 | 190 | 0.17 | 23 | 260 | 37 | C |
| Embodiment 35 | 130 | 190 | 0.17 | 21 | 260 | 33 | C |
| Embodiment 36 | 130 | 190 | 0.17 | 23 | 260 | 37 | C |
| Embodiment 37 | 130 | 190 | 0.17 | 25 | 260 | 39 | C |
| Embodiment 38 | 130 | 190 | 0.17 | 23 | 260 | 37 | B |
| Embodiment 39 | 130 | 190 | 0.17 | 25 | 260 | 39 | B |

TABLE 4-continued

| | | | | | | | |
|---|---|---|---|---|---|---|---|
| Embodiment 40 | 130 | 190 | 0.17 | 24 | 260 | 37 | B |
| Embodiment 41 | 130 | 190 | 0.17 | 21 | 260 | 33 | A |
| Embodiment 42 | 130 | 190 | 0.17 | 24 | 260 | 37 | B |
| Embodiment 43 | 130 | 190 | 0.17 | 23 | 260 | 37 | B |
| Embodiment 44 | 130 | 191 | 0.22 | 30 | 260 | 43 | B |
| Embodiment 45 | 130 | 191 | 0.25 | 30 | 260 | 43 | A |
| Embodiment 46 | 130 | 189 | 0.22 | 28 | 260 | 41 | B |
| Embodiment 47 | 130 | 189 | 0.22 | 28 | 260 | 41 | B |
| Embodiment 48 | 130 | 189 | 0.24 | 28 | 260 | 41 | B |
| Embodiment 49 | 130 | 188 | 0.18 | 29 | 260 | 42 | D |
| Embodiment 50 | 130 | 190 | 0.18 | 29 | 260 | 42 | D |
| Embodiment 51 | 130 | 188 | 0.16 | 30 | 260 | 43 | D |
| Embodiment 52 | 130 | 189 | 0.22 | 32 | 260 | 44 | B |

TABLE 5

| | PPS resin (parts by weight) | Glass fiber (parts by weight) | Silane compound (parts by weight) | Antioxidant (parts by weight) | Elastomer (parts by weight) | Mold temperature (° C.) | Crystallization temperature during cooling (° C.) |
|---|---|---|---|---|---|---|---|
| Embodiment 5 | PPS1(100) | GF2(30) | | | | 130 | 190 |
| Embodiment 27 | PPS1(100) | GF2(30) | 0.2 | | | 130 | 188 |
| Embodiment 53 | PPS2(100) | GF2(30) | | | ER1(1.5) | 130 | 189 |
| Embodiment 54 | PPS1(100) | GF2(80) | | | | 130 | 192 |
| Embodiment 55 | PPS1(100) | GF2(30) | 0.2 | 0.5 | ER1(1.5)/ER2(1.5) | 130 | 187 |

| | Chloroform-extractable content (weight %) | Laser permeability (%) | Heat distortion temperature (° C.) | Laser weld strength (2.0 mm thick) (MPa) | Warpage property | Thermal shock resistance (cycle) |
|---|---|---|---|---|---|---|
| Embodiment 5 | 0.18 | 22 | 260 | 45 | D | D |
| Embodiment 27 | 0.18 | 24 | 260 | 45 | D | C |
| Embodiment 53 | 0.3 | 17 | 260 | 40 | D | B |
| Embodiment 54 | 0.13 | 18 | 260 | 42 | B | C |
| Embodiment 55 | 0.44 | 15 | 260 | 34 | D | A |

TABLE 6

| | PPS resin (parts by weight) | Glass fiber (parts by weight) | Mold temperature (° C.) | Crystallization temperature during cooling (° C.) | Chloroform-extractable content (weight %) | Laser permeability (%) |
|---|---|---|---|---|---|---|
| Embodiment 5 | PPS1(100) | GF2(30) | 130 | 190 | 0.18 | 22 |
| Embodiment 9 | PPS1(100) | GF3(80) | 130 | 192 | 0.13 | 22 |
| Embodiment 56 | PPS2(100) | GF3(80) | 80 | 192 | 0.13 | 38 |

| | Heat distortion temperature (° C.) | Laser weld strength (2.0 mm thick) (MPa) | Laser weld strength (2.0 mm thick) (MPa) | Warpage property |
|---|---|---|---|---|
| Embodiment 5 | 260 | 44 | 42 | D |
| Embodiment 9 | 260 | 42 | 37 | B |
| Embodiment 56 | 260 | 47 | 41 | B |

TABLE 7

| | PPS resin (parts by weight) | Filler (parts by weight) | Amorphous resin (parts by weight) | Antioxidant (parts by weight) | Elastomer (parts by weight) | Mold temperature (° C.) |
|---|---|---|---|---|---|---|
| Embodiment 31 | PPS1(100) | GF3(60) | — | — | — | 130 |
| Embodiment 57 | PPS1(100) | GF4(60) | — | — | — | 130 |
| Embodiment 58 | PPS1(100) | GF4(45)/GB1 (15) | — | — | — | 130 |
| Embodiment 59 | PPS1(100) | GF4(45)/GB2 (15) | — | — | — | 130 |
| Embodiment 60 | PPS1(100) | GF4(45)/EG (15) | — | — | — | 130 |
| Embodiment 61 | PPS1(100) | GF4(45)/HG1 (15) | — | — | — | 130 |

TABLE 7-continued

| | | | | | |
|---|---|---|---|---|---|
| Embodiment 62 | PPS1(100) | GF4(45)/HG2 (15) | — | — | — | 130 |
| Embodiment 63 | PPS1(100) | GF4(45)/BM1 (15) | — | — | — | 130 |
| Embodiment 64 | PPS1(100) | GF4(45)/BM2 (15) | — | — | — | 130 |
| Embodiment 65 | PPS1(100) | GF4(20) | — | — | — | 130 |
| Embodiment 66 | PPS1(100) | GF4(45) | — | — | — | 130 |
| Embodiment 67 | PPS1(100) | GF4(100) | — | — | — | 130 |
| Embodiment 68 | PPS1(100) | GF4(45) | PAI(15) | — | — | 130 |
| Embodiment 69 | PPS1(100) | GF4(45) | PAI(85) | — | — | 130 |
| Embodiment 70 | PPS1(100) | GF4(45) | PAI(100) | — | — | 130 |
| Embodiment 71 | PPS1(100) | GF4(45) | PAR(15) | — | — | 130 |
| Embodiment 72 | PPS1(100) | GF4(45) | PES(15) | — | — | 130 |
| Embodiment 73 | PPS1(100) | GF4(45) | PEI(15) | — | — | 130 |
| Embodiment 74 | PPS1(100) | GF4(45) | PSU(15) | — | — | 130 |
| Embodiment 75 | PPS1(100) | GF4(45) | PAI(15) | 0.3 | — | 130 |
| Embodiment 76 | PPS1(100) | GF4(45) | PAI(15) | 0.3 | ER-1(5) | 130 |
| Embodiment 77 | PPS1(100) | GF4(45) | PAI(15) | 0.3 | ER-1(2)/ER-2 (3) | 130 |
| Embodiment 78 | PPS1(100) | GF4(45) | PAI(15) | 0.3 | ER-1(3)/ER.2 (4) | 130 |
| Embodiment 79 | PPS1(100) | GF4(15)/BM2 (5) | PAI(15) | 0.3 | ER-1(1)/ER-2 (1) | 130 |
| Embodiment 80 | PPS1(100) | GF4(30)/BM2 (15) | PAI(15) | 0.3 | ER-1(1)/ER-2 (1) | 130 |
| Embodiment 81 | PPS1(100) | GF4(40)/BM2 (20) | PAI(15) | 0.3 | ER-1(1)/ER-2 (1) | 130 |
| Comparative Example 8 | PPS5(100) | GF4(20) | — | — | — | 130 |
| Comparative Example 9 | PPS6(100) | GF4(20) | — | — | — | 130 |
| Comparative Example 10 | PPS7(100) | GF4(20) | — | — | — | 130 |

| | Crystallization temperature during cooling (° C.) | Laser weld strength (4.5 mm thick) (MPa) | Warpage property | Heat resistance |
|---|---|---|---|---|
| Embodiment 31 | 190 | 38 | B | 260 |
| Embodiment 57 | 190 | 40 | B | 260 |
| Embodiment 58 | 190 | 38 | B | 260 |
| Embodiment 59 | 190 | 43 | B | 260 |
| Embodiment 60 | 190 | 37 | B | 260 |
| Embodiment 61 | 190 | 39 | B | 260 |
| Embodiment 62 | 190 | 42 | B | 260 |
| Embodiment 63 | 190 | 39 | A | 260 |
| Embodiment 64 | 190 | 40 | A | 260 |
| Embodiment 65 | 188 | 49 | D | 250 |
| Embodiment 66 | 189 | 44 | C | 260 |
| Embodiment 67 | 193 | 31 | A | 260 |
| Embodiment 68 | 191 | 47 | B | 260 |
| Embodiment 69 | 191 | 48 | A | 260 |
| Embodiment 70 | 191 | 40 | A | 260 |
| Embodiment 71 | 189 | 46 | B | 260 |
| Embodiment 72 | 189 | 46 | B | 260 |
| Embodiment 73 | 189 | 46 | B | 260 |
| Embodiment 74 | 189 | 46 | B | 260 |
| Embodiment 75 | 191 | 49 | B | 260 |
| Embodiment 76 | 190 | 37 | B | 260 |
| Embodiment 77 | 190 | 37 | B | 260 |
| Embodiment 78 | 190 | 30 | B | 255 |
| Embodiment 79 | 190 | 47 | A | 255 |
| Embodiment 80 | 190 | 43 | A | 260 |
| Embodiment 81 | 192 | 39 | A | 260 |
| Comparative Example 8 | 225 | Not welded | D | 250 |
| Comparative Example 9 | 225 | Not welded | D | 250 |
| Comparative Example 10 | 220 | Not welded | D | 250 |

TABLE 8

|  | PPS resin (parts by weight) | Filler (parts by weight) | Amorphous resin (parts by weight) | Antioxidant (parts by weight) | Elastomer (parts by weight) | Mold temperature (° C.) | Laser weld strength (5.0 mm thick) (MPa) |
|---|---|---|---|---|---|---|---|
| Embodiment 31 | PPS1(100) | GF3(60) | — | — | — | 130 | 30 |
| Embodiment 57 | PPS1(100) | GF4(60) | — | — | — | 130 | 32 |
| Embodiment 58 | PPS1(100) | GF4(45)/GB1(15) | — | — | — | 130 | 30 |
| Embodiment 59 | PPS1(100) | GF4(45)/GB2(15) | — | — | — | 130 | 35 |
| Embodiment 61 | PPS1(100) | GF4(45)/HG1(15) | — | — | — | 130 | 31 |
| Embodiment 62 | PPS1(100) | GF4(45)/HG2(15) | — | — | — | 130 | 34 |
| Embodiment 63 | PPS1(100) | GF4(45)/BM1(15) | — | — | — | 130 | 31 |
| Embodiment 64 | PPS1(100) | GF4(45)/BM2(15) | — | — | — | 130 | 32 |
| Embodiment 65 | PPS1(100) | GF4(20) | — | — | — | 130 | 41 |
| Embodiment 66 | PPS1(100) | GF4(45) | — | — | — | 130 | 36 |
| Embodiment 68 | PPS1(100) | GF4(45) | PAI(15) | — | — | 130 | 39 |
| Embodiment 69 | PPS1(100) | GF4(45) | PAI(65) | — | — | 130 | 40 |
| Embodiment 70 | PPS1(100) | GF4(45) | PAI(100) | — | — | 130 | 32 |
| Embodiment 71 | PPS1(100) | GF4(45) | PAR(15) | — | — | 130 | 38 |
| Embodiment 72 | PPS1(100) | GF4(45) | PES(15) | — | — | 130 | 38 |
| Embodiment 73 | PPS1(100) | GF4(45) | PEI(15) | — | — | 130 | 38 |
| Embodiment 74 | PPS1(100) | GF4(45) | PSU(15) | — | — | 130 | 38 |
| Embodiment 75 | PPS1(100) | GF4(45) | PAI(15) | 0.3 | — | 130 | 41 |
| Embodiment 79 | PPS1(100) | GF4(15)/BM2(5) | PAI(15) | 0.3 | ER-1(1)/ER-2(1) | 130 | 39 |
| Embodiment 80 | PPS1(100) | GF4(30)/BM2(15) | PAI(15) | 0.3 | ER-1(1)/ER-2(1) | 130 | 35 |
| Embodiment 81 | PPS1(100) | GF4(40)/BM2(20) | PAI(15) | 0.3 | ER-1(1)/ER-2(1) | 130 | 31 |
| Comparative Example 8 | PPS5(100) | GF4(20) | — | — | — | 130 | Not welded |
| Comparative Example 9 | PPS6(100) | GF4(20) | — | — | — | 130 | Not welded |
| Comparative Example 10 | PPS7(100) | GF4(20) | — | — | — | 130 | Not welded |

TABLE 9

|  | PPS resin (parts by weight) | Filler (parts by weight) | Amorphous resin (parts by weight) | Antioxidant (parts by weight) | Elastomer (parts by weight) | Thermal shock resistance (cycle) |
|---|---|---|---|---|---|---|
| Embodiment 75 | PPS1(100) | GF4(45) | PAI(15) | 0.3 | — | D |
| Embodiment 76 | PPS1(100) | GF4(45) | PAI(15) | 0.3 | ER-1(5) | B |
| Embodiment 77 | PPS1(100) | GF4(45) | PAI(15) | 0.3 | ER-1(2)/ER-2(3) | A |
| Embodiment 78 | PPS1(100) | GF4(45) | PAI(15) | 0.3 | ER-1(3)/ER-2(4) | A |
| Embodiment 79 | PPS1(100) | GF4(15)/BM2(5) | PAI(15) | 0.3 | ER-1(1)/ER-2(1) | D |
| Embodiment 80 | PPS1(100) | GF4(30)/BM2(15) | PAI(15) | 0.3 | ER-1(1)/ER-2(1) | B |
| Embodiment 81 | PPS1(100) | GF4(40)/BM2(20) | PAI(15) | 0.3 | ER-1(1)/ER-2(1) | A |
| Comparative Example 8 | PPS5(100) | GF4(20) | — | — | — | D |
| Comparative Example 9 | PPS6(100) | GF4(20) | — | — | — | D |
| Comparative Example 10 | PPS7(100) | GF4(20) | — | — | — | E |

What is claimed is:

1. A polyphenylene sulfide resin composition composite molded product having a first molded part which comprises 100 parts by weight of a polyphenylene sulfide resin (A) and, compounded therewith, 1 to 100 parts by weight of glass fiber (B) having a monofilament diameter of about 12 μm or larger, and has a crystallization temperature during cooling of 170 to 205° C. and a second resin molded part, wherein the first molded part is joined to the second resin molded part by a laser weld.

2. The polyphenylene sulfide resin composition composite molded product of claim 1, wherein the composition of the first molded part comprises a chloroform-extractable content of about 0.5 wt. % or less, and the first molded part comprises a 2 mm-thick molded portion which has a transmittance of about 15% or more for a laser beam having a wavelength of 940 nm and a heat distortion temperature of about 230° C. or more under a load of 1.82 MPa.

3. The polyphenylene sulfide resin composition composite molded product of claim 1 or 2, wherein the glass fiber has a monofilament diameter of 15 μm or larger.

4. The polyphenylene sulfide resin composition composite molded product of claim 1, further comprising a compound of 1 to 200 parts by weight of a filler (C) having a refractive index of about 1.6 to about 1.8 and/or a filler (D) having a refractive index of less than about 1.6 or more than about 1.8 and an average particle diameter of about 30 μm or more.

5. The polyphenylene sulfide resin composition composite molded product of claim 4, wherein the filler (C) is fibrous or plate-shaped alumina hydrate (C1), and/or fibrous or granular H glass (C2) other than the glass fiber (B).

6. The polyphenylene sulfide resin composition composite molded product of claim 4, wherein the filler (D) is glass flake (D1) and/or glass beads (D2).

7. The polyphenylene sulfide resin composition composite molded product of claim 1, which comprises 100 parts by weight of a polyphenylene sulfide resin (A) and, further compounded therewith, 0.1 to 200 parts by weight of one or more amorphous resin selected from polyamide-imide resin (E1), polyether-imide resin (E2), polyethersulfone resin (E3) and polysulfone resin (E4).

8. The polyphenylene sulfide resin composition composite molded product of claim 1, which comprises 100 parts by weight of a polyphenylene sulfide resin (A) and, further compounded therewith, 0.01 to 3 parts by weight of silane compound (F) and/or 0.01 to 3 parts by weight of antioxidant (G).

9. The polyphenylene sulfide resin composition composite molded product of claim 1, which comprises 100 parts by weight of a polyphenylene sulfide resin (A) and, further compounded therewith, 0.5 to 20 parts by weight of elastomer (H).

10. The polyphenylene sulfide resin composition composite molded product of claim 1, wherein the first molded part has a transmission part with a thickness of about 3 mm or less at a welding site on a laser beam transmission side.

11. A method for manufacturing a polyphenylene sulfide resin composition composite molded product of claim 1 comprising injection molding the first molded part in a mold at a mold temperature of about 100° C. or less and joining the second resin molded part to the first molded part by laser welding, whereby a polyphenylene sulfide resin composition molded product is formed.

12. The polyphenylene sulfide resin composition composite molded product of claim 1, wherein the second resin molded part comprises polyphenylene sulfide resin.

13. The method for manufacturing a polyphenylene sulfide resin composition composite molded product of claim 11 further comprising heat-treating the polyphenylene sulfide resin composite molded product.

14. The polyphenylene sulfide resin composition composite molded product of claim 1, wherein the glass fiber (B) is chopped strand fiber or milled fiber of short fiber type.

15. A laser welding method comprising:
  superimposing a molded product of a laser beam transmitting side formed of a polyphenylene sulfide resin composition which comprises 100 parts by weight of a polyphenylene sulfide resin (A) and, compounded therewith, 1 to 100 parts by weight of glass fiber (B) having a monofilament diameter of about 12 μm or larger, and has a crystallization temperature during cooling of 170 to 205° C. on a molded product of a laser beam absorbing side;
  irradiating the molded product of the laser beam absorbing side with a laser beam through the molded product of the laser beam transmitting side; and
  fusing and bonding the two molded products.

16. A laser welded and molded product comprising a polyphenylene sulfide resin composition which comprises 100 parts by weight of a polyphenylene sulfide resin (A) and, compounded therewith, 1 to 100 parts by weight of glass fiber (B) having a monofilament diameter of about 12 μm or larger, and has a crystallization temperature during cooling of 170 to 205° C.

17. A polyphenylene sulfide resin composition composite molded product having a first molded part which comprises 100 parts by weight of a polyphenylene sulfide resin (A) and, compounded therewith, 1 to 100 parts by weight of glass fiber (B) having a monofilament diameter of about 12 μm or larger, and has a crystallization temperature during cooling of 170 to 205° C. and a second resin molded part, wherein the first molded part has a transmission part with a thickness of about 3 mm or less at a welding site on a laser beam transmission side and is joined to the second resin molded part.

18. The polyphenylene sulfide resin composition composite molded product of claim 17, wherein the composition of the first molded part comprises a chloroform-extractable content of about 0.5 wt. % or less, and the first molded part comprises a 2 mm-thick molded portion which has a transmittance of about 15% or more for a laser beam having a wavelength of 940 nm and a heat distortion temperature of about 230° C. or more under a load of 1.82 MPa.

19. The polyphenylene sulfide resin composition composite molded product of claim 17 or 18, wherein the glass fiber has a monofilament diameter of 15 μm or larger.

20. The polyphenylene sulfide resin composition composite molded product of claim 17, which compounds 1 to 200 parts by weight of a filler (C) having a refractive index of about 1.6 to about 1.8 and/or a filler (D) having a refractive index of less than about 1.6 or more than about 1.8 and an average particle diameter of about 30 μm or more.

21. The polyphenylene sulfide resin composition composite molded product of claim 20, wherein the filler (C) is fibrous or plate-shaped alumina hydrate (C1), and/or fibrous or granular H glass (C2) other than the glass fiber (B).

22. The polyphenylene sulfide resin composition composite molded product of claim 20, wherein the filler (D) is glass flake (D1) and/or glass beads (D2).

23. The polyphenylene sulfide resin composition composite molded product of claim 17, which comprises 100 parts by weight of a polyphenylene sulfide resin (A) and, further compounded therewith, 0.1 to 200 parts by weight of one or more amorphous resin selected from polyamide-imide resin (E1), polyether-imide resin (E2), polyethersulfone resin (E3) and polysulfone resin (E4).

24. The polyphenylene sulfide resin composition composite molded product of claim 17, which comprises 100 parts by weight of a polyphenylene sulfide resin (A) and, further compounded therewith, 0.01 to 3 parts by weight of silane compound (F) and/or 0.01 to 3 parts by weight of antioxidant (G).

25. The polyphenylene sulfide resin composition composite molded product of claim 17, which comprises 100 parts by weight of a polyphenylene sulfide resin (A) and, further compounded therewith, 0.5 to 20 parts by weight of elastomer (H).

26. A method for manufacturing a polyphenylene sulfide resin composition composite molded product of claim 17 comprising injection molding the first molded part in a mold at a mold temperature of about 100° C. or less and joining the second resin molded part to the first molded part by laser welding, whereby a polyphenylene sulfide resin composition molded composite product is formed.

27. The polyphenylene sulfide resin composition composite molded product of claim 17, wherein the second resin molded part comprises polyphenylene sulfide resin.

28. The method for manufacturing a polyphenylene sulfide resin composition composite molded product of claim 27 further comprising heat-treating the polyphenylene sulfide resin composite molded product.

29. The polyphenylene sulfide resin composition composite molded product of claim 17, wherein the glass fiber (B) is chopped strand fiber or milled fiber of short fiber type.

* * * * *

UNITED STATES PATENT AND TRADEMARK OFFICE
CERTIFICATE OF CORRECTION

PATENT NO. : 7,569,635 B2 Page 1 of 1
APPLICATION NO. : 10/558548
DATED : August 4, 2009
INVENTOR(S) : Kojima et al.

It is certified that error appears in the above-identified patent and that said Letters Patent is hereby corrected as shown below:

In Column 15

At line 33, please delete the following paragraph:

"The crystallization temperature during cooling, chloroform-extractable content, laser transmittance and heat distortion temperature of the PPS resin compositions used for the present invention are based on the following measuring method."

Signed and Sealed this

Thirtieth Day of March, 2010

David J. Kappos
*Director of the United States Patent and Trademark Office*